(12) United States Patent
Lanting et al.

(10) Patent No.: US 9,129,224 B2
(45) Date of Patent: Sep. 8, 2015

(54) SYSTEMS AND METHODS FOR INCREASING THE ENERGY SCALE OF A QUANTUM PROCESSOR

(71) Applicant: D-WAVE SYSTEMS INC., Burnaby (CA)

(72) Inventors: Trevor Michael Lanting, Vancouver (CA); Colin Enderud, Vancouver (CA); Elena Tolkacheva, Burnaby (CA)

(73) Assignee: D-Wave Systems Inc., Burnaby (CA)

( * ) Notice: Subject to any disclaimer, the term of this patent is extended or adjusted under 35 U.S.C. 154(b) by 0 days.

(21) Appl. No.: 14/340,291

(22) Filed: Jul. 24, 2014

(65) Prior Publication Data

US 2015/0032991 A1    Jan. 29, 2015

Related U.S. Application Data

(60) Provisional application No. 61/858,023, filed on Jul. 24, 2013.

(51) Int. Cl.
*H03K 19/195*     (2006.01)
*G06N 99/00*     (2010.01)

(52) U.S. Cl.
CPC ................... *G06N 99/002* (2013.01)

(58) Field of Classification Search
USPC .......................................................... 326/1–7
See application file for complete search history.

(56) References Cited

U.S. PATENT DOCUMENTS

| | | | |
|---|---|---|---|
| 4,280,095 A | 7/1981 | Hinton | |
| 6,885,325 B2 | 4/2005 | Omelyanchouk et al. | |
| 6,984,846 B2 | 1/2006 | Newns et al. | |
| 7,135,701 B2 | 11/2006 | Amin et al. | |
| 7,418,283 B2 | 8/2008 | Amin | |

(Continued)

FOREIGN PATENT DOCUMENTS

JP     2002-374152 A     12/2002

OTHER PUBLICATIONS

International Search Report and Written Opinion mailed Nov. 7, 2014, for corresponding International Application No. PCT/US2014/048052, 10 pages.

(Continued)

*Primary Examiner* — Anh Tran
(74) *Attorney, Agent, or Firm* — Seed IP Law Group PLLC

(57) ABSTRACT

Increasing the energy scale of a quantum processor improves its performance. Energy scale of a quantum processor may be increased by increasing the coupling strength of communicatively coupled superconducting devices comprised in the quantum processor. Configuring the physical dimensions of communicatively coupled superconducting devices such that an intentional direct coupling is induced between a pair of superconducting devices communicatively coupled by a coupling device may controllably add an additional mutual inductance to the mutual inductance of the pair of superconducting devices. Furthermore, reducing the beta parameter of a coupling device may improve the tunability of the coupling device. The combined effects of improved tunability of the coupling devices and the increased coupling strength between superconducting devices communicatively coupled by respective coupling devices comprised in the quantum processor may thus improve the performance of the quantum processor.

35 Claims, 9 Drawing Sheets

(56) References Cited

U.S. PATENT DOCUMENTS

| | | | |
|---|---|---|---|
| 7,533,068 | B2 | 5/2009 | Maassen van den Brink et al. |
| 7,605,600 | B2 | 10/2009 | Harris |
| 7,619,437 | B2 | 11/2009 | Thom et al. |
| 7,800,395 | B2 | 9/2010 | Johnson et al. |
| 7,843,209 | B2 | 11/2010 | Berkley |
| 7,847,615 | B2 | 12/2010 | Yorozu et al. |
| 7,880,529 | B2 | 2/2011 | Amin |
| 7,898,282 | B2 | 3/2011 | Harris et al. |
| 8,008,942 | B2 | 8/2011 | van den Brink et al. |
| 8,073,808 | B2 | 12/2011 | Rose |
| 8,169,231 | B2 | 5/2012 | Berkley |
| 8,174,305 | B2 | 5/2012 | Harris |
| 8,190,548 | B2 | 5/2012 | Choi |
| 8,195,596 | B2 | 6/2012 | Rose et al. |
| 8,421,053 | B2 | 4/2013 | Bunyk et al. |
| 8,772,759 | B2 | 7/2014 | Bunyk et al. |
| 2006/0097746 | A1 | 5/2006 | Amin |
| 2008/0052055 | A1 | 2/2008 | Rose et al. |
| 2008/0258753 | A1* | 10/2008 | Harris ............................. 326/4 |
| 2010/0194466 | A1 | 8/2010 | Yorozu et al. |
| 2011/0057169 | A1 | 3/2011 | Harris et al. |
| 2011/0060780 | A1 | 3/2011 | Berkley et al. |
| 2012/0187378 | A1 | 7/2012 | Bonderson et al. |
| 2014/0097405 | A1* | 4/2014 | Bunyk ............................ 257/31 |
| 2014/0266406 | A1 | 9/2014 | Abraham et al. |
| 2014/0337612 | A1* | 11/2014 | Williams ..................... 713/100 |

OTHER PUBLICATIONS

Barends et al., "Coherent Josephson qubit suitable for scalable quantum integrated circuits," arXiv:1304.2322v1, Apr. 8, 2013, 10 pages.

Berggren, "Quantum Computing With Superconductors," *Proceedings of the IEEE* 92(10):1630-1638, Oct. 2004.

Bocko et al., "Prospects for Quantum Coherent Computation Using Superconducting Electronics," *IEEE Transactions on Applied Superconductivity* 7(2):3638-3641, Jun. 1997.

Carelli et al., "SQUID Systems for Macroscopic Quantum Coherence and Quantum Computing," *IEEE Transactions on Applied Superconductivity* 11(1):210-214, Mar. 2001.

Chen et al., "Qubit architecture with high coherence and fast tunable coupling," arXiv:1402.7367v1, Feb. 28, 2014, 10 pages.

Clarke et al., "Superconducting quantum bits," *Nature* 453:1031-1042, Jun. 19, 2008.

Devoret et al., "Superconducting Circuits for Quantum Information: An Outlook," *Science* 339:1169-1174, Mar. 8, 2013.

Devoret et al., "Superconducting Qubits: A Short Review," arXiv:cond-mat/0411174v1, Nov. 7, 2004, 41 pages.

Lanting et al., "Systems and Methods for Increasing the Energy Scale of a Quantum Processor," U.S. Appl. No. 61/858,023, filed Jul. 24, 2013, 49 pages.

Maassen van den Brink et al., "Mediated tunable coupling of flux qubits," arXiv:cond-mat/0501148v2, Oct. 13, 2005, 16 pages.

Makhlin et al., "Quantum-state engineering with Josephson-junction devices," *Reviews of Modern Physics* 73(2):357-400, Apr. 2001.

Martinis, "Superconducting phase qubits," *Quantum Inf Process* 8:81-103, 2009.

Steffen et al., "Quantum computing: An IBM perspective," *IBM Journal of Research and Development* 55(5): 13:1-13:11, Sep./Oct. 2011.

Wendin et al., "Superconducting Quantum Circuits, Qubits and Computing," arXiv:cond-mat/0508729v1, Aug. 30, 2005, 60 pages.

Zagoskin et al., "Superconducting qubits," arXiv:0805.0164v1, May 1, 2008, 34 pages.

\* cited by examiner

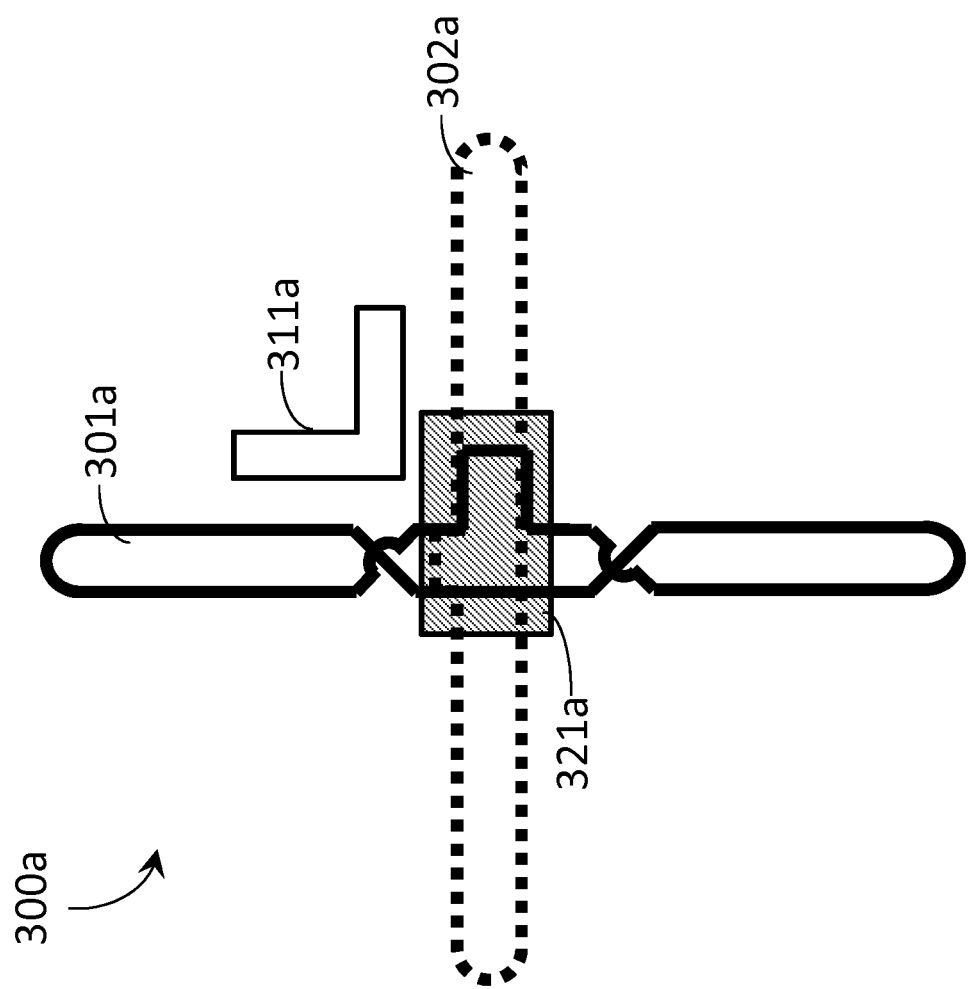

SYSTEMS AND METHODS FOR INCREASING THE ENERGY SCALE OF A QUANTUM PROCESSOR

BACKGROUND

Field

This disclosure generally relates to improving the performance of a quantum processor.

Quantum Devices

Quantum devices are structures in which quantum mechanical effects are observable. Quantum devices include circuits in which current transport is dominated by quantum mechanical effects. Such devices include spintronics, where electronic spin is used as a resource, and superconducting circuits. Both spin and superconductivity are quantum mechanical phenomena. Quantum devices can be used for measurement instruments, in computing machinery, and the like.

Quantum Computation

Quantum computation and quantum information processing are active areas of research and define classes of vendible products. A quantum computer is a system that makes direct use of quantum-mechanical phenomena, such as, superposition, tunneling, and entanglement, to perform operations on data. The elements of a quantum computer are not binary digits (bits) but typically are quantum binary digits or qubits. Quantum computers hold the promise of providing exponential speedup for certain classes of computation problems like simulating quantum physics. Useful speedup may exist for other classes of problems.

There are several types of quantum computers. An early proposal from Feynman in 1981 included creating artificial lattices of spins. More complicated proposals followed including a quantum circuit model where logical gates are applied to qubits in a time ordered way. In 2000, a model of computing was introduced for solving satisfiability problems; based on the adiabatic theorem this model is called adiabatic quantum computing. This model is believed useful for solving hard optimization problems and potentially other problems.

Adiabatic Quantum Computation

Adiabatic quantum computation typically involves evolving a system from a known initial Hamiltonian (the Hamiltonian being an operator whose eigenvalues are the allowed energies of the system) to a final Hamiltonian by gradually changing the Hamiltonian. A simple example of an adiabatic evolution is a linear interpolation between an initial Hamiltonian and a final Hamiltonian. An example is given by:

$$H_e = (1-s)H_i + sH_f \quad (1)$$

where $H_i$ is the initial Hamiltonian, $H_f$ is the final Hamiltonian, $H_e$ is the evolution or instantaneous Hamiltonian, and s is an evolution coefficient which controls the rate of evolution. As the system evolves, the evolution coefficient s goes from 0 to 1 such that at the beginning (i.e., s=0) the evolution Hamiltonian $H_e$ is equal to the initial Hamiltonian $H_i$ and at the end (i.e., s=1) the evolution Hamiltonian $H_e$ is equal to the final Hamiltonian $H_f$. Before the evolution begins, the system is typically initialized in a ground state of the initial Hamiltonian $H_i$ and the goal is to evolve the system in such a way that the system ends up in a ground state of the final Hamiltonian $H_f$ at the end of the evolution. If the evolution is too fast, then the system can be excited to a higher energy state, such as the first excited state. In the present systems and devices, an "adiabatic" evolution is an evolution that satisfies the adiabatic condition:

$$\dot{s}|<1|dH_e/ds|0>|=\delta g^2(s) \quad (2)$$

where $\dot{s}$ is the time derivative of s, g(s) is the difference in energy between the ground state and first excited state of the system (also referred to herein as the "gap size") as a function of s, and δ is a coefficient much less than 1. Generally the initial Hamiltonian $H_i$ and the final Hamiltonian $H_f$ don't commute. That is, $[H_i, H_f] \neq 0$.

The process of changing the Hamiltonian in adiabatic quantum computing may be referred to as evolution. The rate of change, for example, change of s, is slow enough that the system is always in the instantaneous ground state of the evolution Hamiltonian during the evolution, and transitions at anti-crossings (i.e., when the gap size is smallest) are avoided. The example of a linear evolution schedule is given above. Other evolution schedules are possible including non-linear, parametric, and the like. Further details on adiabatic quantum computing systems, methods, and apparatus are described in, for example, U.S. Pat. Nos. 7,135,701 and 7,418,283.

Quantum Annealing

Quantum annealing is a computation method that may be used to find a low-energy state, typically preferably the ground state, of a system. Similar in concept to classical annealing, the method relies on the underlying principle that natural systems tend towards lower energy states because lower energy states are more stable. However, while classical annealing uses classical thermal fluctuations to guide a system to a low-energy state and ideally its global energy minimum, quantum annealing may use quantum effects, such as quantum tunneling, to reach a global energy minimum more accurately and/or more quickly than classical annealing. In quantum annealing thermal effects and other noise may be present to aid the annealing. However, the final low-energy state may not be the global energy minimum. Adiabatic quantum computation, therefore, may be considered a special case of quantum annealing for which the system, ideally, begins and remains in its ground state throughout an adiabatic evolution. Thus, those of skill in the art will appreciate that quantum annealing systems and methods may generally be implemented on an adiabatic quantum computer. Throughout this specification and the appended claims, any reference to quantum annealing is intended to encompass adiabatic quantum computation unless the context requires otherwise.

Quantum annealing uses quantum mechanics as a source of disorder during the annealing process. The optimization problem is encoded in a Hamiltonian $H_P$, and the algorithm introduces quantum effects by adding a disordering Hamiltonian $H_D$ that does not commute with $H_P$. An example case is:

$$H_E \propto A(t)H_D + B(t)H_P \quad (3)$$

where A(t) and B(t) are time dependent envelope functions. The Hamiltonian $H_E$ may be thought of as an evolution Hamiltonian similar to $H_e$ described in the context of adiabatic quantum computation above. The disorder may be removed by removing $H_D$ (i.e., reducing A(t)). The disorder may be added and then removed. Thus, quantum annealing is similar to adiabatic quantum computation in that the system starts with an initial Hamiltonian and evolves through an evolution Hamiltonian to a final "problem" Hamiltonian $H_P$ whose ground state encodes a solution to the problem. If the evolution is slow enough, the system will typically settle in the global minimum (i.e., the exact solution), or in a local minimum close in energy to the exact solution. The performance of the computation may be assessed via the residual energy (difference from exact solution using the objective function) versus evolution time. The computation time is the time required to generate a residual energy below some acceptable threshold value. In quantum annealing, $H_P$ may encode an optimization problem but the system does not necessarily stay in the ground state at all times. The energy landscape of $H_P$ may be crafted so that its global minimum is the answer to the problem to be solved, and low-lying local minima are good approximations.

The reduction of the envelope function A(t) in quantum annealing may follow a defined schedule known as an annealing schedule. This is an example of an evolution schedule. Unlike traditional forms of adiabatic quantum computation where the system begins and remains in its ground state throughout the evolution, in quantum annealing the system may not remain in its ground state throughout the entire annealing schedule. As well, quantum annealing may be implemented as a heuristic technique, where low-energy states with energy near that of the ground state may provide approximate solutions to the problem.

Superconducting Qubits

There is a type of solid state qubit which is based on circuits of superconducting materials. Superconducting material conducts without electrical resistance under certain conditions like below a critical temperature, a critical current, or a magnetic field strength, or for some materials above a certain pressure. There are two superconducting effects that underlie how superconducting qubits operate: flux quantization, and Josephson tunneling.

Flux is quantized when a loop of superconducting material, threaded by a magnetic flux, is cooled below its superconducting critical temperature while the field is switched off. The supercurrent continues in an effort to maintain the flux. The flux is quantized. Thus, superconductivity is not simply the absence of electrical resistance but rather a quantum mechanical effect. All the current in the loop is governed by a single wavefunction and for the wavefunction to be single valued at any point in the loop the flux is quantized.

Josephson tunneling is where the current tunnels through a minor interruption in the loop, such as an insulating gap of a few nanometers. The amount of current is sinusoidally dependent on the phase difference across the interruption. This sinusoidally dependency is a non-linearity that leads to anharmonicity in the energy levels of the system.

These superconducting effects present in different configurations to give rise to different types of superconducting qubits including flux, phase, charge, and hybrid qubits. These different types of qubits depend on the topology of the loops and the physical parameters of the parts of the loops, such as, inductance, capacitance, and persistent current.

Persistent Current

A superconducting flux qubit may comprise a loop of superconducting material (called a "qubit loop") that is interrupted by at least one Josephson junction. Since the qubit loop is superconducting, it effectively has no electrical resistance. Thus, electrical current traveling in the qubit loop may experience no dissipation. If an electrical current is coupled into the qubit loop by, for example, a magnetic flux signal, this current may continue to circulate around the qubit loop even when the signal source is removed. The current may persist indefinitely until it is interfered with in some way or until the qubit loop is no longer superconducting (due to, for example, heating the qubit loop above its critical temperature). For the purposes of this specification, the term "persistent current" is used to describe an electrical current circulating in superconducting loop interrupted by at least one Josephson junction.

The sign and magnitude of a persistent current may be influenced by a variety of factors, including but not limited to a flux signal $\phi_X$ coupled directly into the superconducting loop and a flux signal $\phi_{CJJ}$ (or $\phi_{co}$) coupled into a compound Josephson junction that interrupts the superconducting loop.

Quantum Processor

A quantum processor may take the form of a superconducting quantum processor. A superconducting quantum processor may include a number of qubits and associated local bias devices, for instance two or more superconducting qubits. A superconducting quantum processor may also employ coupling devices (i.e., "couplers") providing communicative coupling between qubits. A qubit and a coupler resemble each other but differ in physical parameters. One difference is the screening parameter, $\beta$. Consider an rf-SQUID, superconducting loop interrupted by a Josephson junction, $\beta$ is the ratio of the inductance of the Josephson junction to the geometrical inductance of the loop. A design with lower values of $\beta$, about 1, behaves more like a simple inductive loop, a monostable device. A design with higher values is more dominated by the Josephson junctions, and is more likely to have bistable behavior. The parameter, $\beta$ is defined a $2\pi LI_C/\Phi_0$. That is, $\beta$ is proportional to the product of inductance and critical current. One can vary the inductance, for example, a qubit is normally larger than its associated coupler. The larger device has a larger inductance and thus the qubit is often a bistable device and a coupler monostable. Alternatively the critical current can be varied, or the product of the critical current and inductance can be varied. A qubit often will have more devices associated with it. Further details and examples quantum processors that may be used in conjunction with the present systems and devices are described in, for example, U.S. Pat. Nos. 7,533,068; 8,008,942; 8,195,596; 8,190,548; and 8,421,053.

The types of problems that may be solved by any particular embodiment of a quantum processor, as well as the relative size and complexity of such problems, typically depend on many factors. Two such factors may include the number of qubits in the quantum processor and the connectivity (i.e., the availability of communicative couplings) between the qubits in the quantum processor. Throughout this specification, the term "connectivity" is used to describe the maximum number of possible communicative coupling paths that are physically available (e.g., whether active or not) to communicably couple between individual qubits in a quantum processor without the use of intervening qubits. For example, a qubit with a connectivity of three is capable of communicably coupling to up to three other qubits without any intervening qubits. In other words, there are communicative coupling paths available to three other qubits, although in any particular application all or less than all (e.g., zero, one, two, or three) of those communicative coupling paths may be employed. In a quantum processor employing coupling devices between qubits, this would mean a qubit having a connectivity of three is selectively communicably coupleable to each of three other qubits via a respective one of three coupling devices. Typically, the number of qubits in a quantum processor limits the size of problems that may be solved and the connectivity between the qubits in a quantum processor limits the complexity of the problems that may be solved.

Many prior art techniques for using adiabatic quantum computation and/or quantum annealing to solve computational problems involve finding ways to directly map/embed a representation of a problem to the quantum processor itself. For example, US Patent Publication 2008-0052055 describes solving a protein folding problem by first casting the protein folding problem as an Ising spin glass problem and then embedding the Ising spin glass problem to a quantum processor, and U.S. Pat. No. 8,073,808 describes solving a computational problem (e.g., an image-matching problem) by first casting the problem as a quadratic unconstrained binary optimization ("QUBO") problem and then embedding the QUBO problem directly on a quantum processor. In both cases, a problem is solved by first casting the problem in a contrived formulation (e.g., Ising spin glass, QUBO, etc.) because that particular formulation maps directly to the particular embodiment of the quantum processor being employed. In other words, an intermediate formulation is used to re-cast the original problem into a form that accommodates the number of qubits and/or connectivity constraints in the particular quantum processor and then the intermediate formulation is embedded on the quantum processor. This "embedding" approach is motivated by limitations inherent in the architecture of the quantum processor being employed. For example, a quantum processor that employs only pair-wise interactions between qubits (i.e., a quantum processor employing coupling devices that provide communicative coupling between respective pairs of qubits but not, for example, between larger sets of qubits, such as three or more qubits) is intrinsically well-suited to solve problems having quadratic terms (e.g., QUBO problems) because quadratic terms in a problem map directly to pair-wise interactions between qubits in the quantum processor.

Energy in Inductive Coupling

The energy scale for specifying a problem Hamiltonian on a quantum processor is given by $M_{AFM}I_p^2$ where $M_{AFM}$ is the anti-ferromagnetic mutual inductance between two superconducting devices communicatively coupled by a coupling device such as two communicatively coupled qubits and $I_p$ is the average persistent current of the two superconducting devices. It is desired to increase this energy scale to improve the performance of the quantum processor. However, coupling devices have an upper-limit to the mutual inductance between two communicatively coupled superconducting devices which is set by the coupler inductance and the device-to-coupler mutual inductance. The anti-ferromagnetic mutual inductance between two communicatively coupled superconducting devices is given by:

$$M_{AFM} = M_1 M_2 X_{AFM} \quad (4)$$

where $M_1$ is the mutual inductance between the first superconducting device and the coupling device, $M_2$ is the mutual inductance between the second superconducting device and the coupling device, and $X_{AFM}$ is the susceptibility of the coupling device (i.e., how strongly the coupling device couples the two superconducting devices together). The susceptibility of a coupling device is set by a flux bias of the coupling device given by $\phi_{co}$. Increasing the critical current $I_c$ of the coupler will increase $X_{AFM}$ to an upper limit of $1/L_{co}$ where $L_{co}$ denotes the inductance of the coupler. Therefore, by increasing the persistent current of the coupling devices in a quantum processor by a large factor (e.g., more than 10 times the persistent current), $X_{AFM}$ can be almost doubled. However, increasing the persistent current of a coupling device increases the coupler's screening parameter or beta (a convenience parameter representing the behavior of a superconducting loop such as a qubit or coupling device that is used for modeling purposes). The beta ($\beta$) of a device is given by:

$$\beta = \frac{2\pi L_X I_C}{\phi_0} \quad (5)$$

where $\phi_0$ is the flux quantum of the superconducting loop, and $L_X$ is the inductance of a device labeled X. For example, $L_{CO}$ would be for a coupler and $L_{QU}$ would be for a qubit. Increasing coupler beta increases the slope of the coupler susceptibility in the ferromagnetic region. Therefore, the coupler critical current cannot be increased by much without sacrificing the precision to which ferromagnetic/anti-ferromagnetic couplings can be specified.

BRIEF SUMMARY

Therefore, there is a need in the art for techniques that can both increase the energy scale of a quantum processor without negatively affecting the parameters of the superconducting devices in the quantum processor such as coupling devices by for example, increasing the linearity of the coupler response/susceptibility.

A method of operation of a quantum processor, wherein the quantum processor includes a plurality of superconducting devices which are superconductive at or below threshold temperatures, a number of the superconducting devices having a respective loop and at least one respective Josephson junction interrupting the loop, for a first one and a second one of the superconducting device which have respective loops that partially overlaps one another and are not electrically contiguous with one another may be summarized as including intentionally causing a crosstalk between at least one pair of two of the superconducting devices to increase a coupling strength between the pair of superconducting devices; and additionally, communicatively coupling the two of the superconducting devices of the pair via at least one superconducting coupling device. Intentionally causing a crosstalk between at least one pair of two of the superconducting devices may include adjusting an inductance of the first or the second ones of the superconducting devices. Adjusting an inductance of the first or the second ones of the superconducting devices may include decreasing an inductance of the first or the second ones of the superconducting devices. Decreasing an inductance of the first or the second ones of the superconducting devices may include decreasing a length of the respective loop in the at least one of the first or the second ones of the superconducting devices. Decreasing a length of the respective loop in the at least one of the first or the second ones of the superconducting devices may include decreasing a length during at least one of a design or a fabrication of the quantum processor over a length of a loop where the superconducting devices are substantially perpendicular to one another. Intentionally causing a crosstalk between at least one pair of two of the superconducting devices may include fabricating at least one of the pair of superconducting devices to include a respective pair of parallel legs in the respective loop, each of the legs having a jog therein. Intentionally causing a crosstalk between at least one pair of two of the superconducting devices may include fabricating at least one of the pair of superconducting devices to include a respective pair of legs in the respective loop, each of the legs having a Z-shape. Intentionally causing a crosstalk between at least one pair of two of the superconducting devices may include adjusting a beta value of the at least one superconducting coupler device which communicatively couples the first one and the second one of the superconducting devices to one another based at least in part on the non-perpendicular orientation of the second portion of the first one of the superconducting devices with respect to the second portion of the second one of the superconducting devices. Adjusting a beta value of the at least one superconducting coupler device may include decreasing the beta value in the at least one superconducting coupler device. Adjusting a beta value of the at least one superconducting coupler device may include decreasing a magnitude of a persistent current in the at least one superconducting coupler device that communicatively couples the first one and the second one of the superconducting devices. Adjusting a beta value of the at least one superconducting coupler device may include adjusting a beta value of the at least one superconducting coupler device based on a magnitude of an angular deviation between the second portions of the first one and the second one of the superconducting devices from being perpendicular to one another. Intentionally causing a crosstalk between at least one pair of two of the superconducting devices may include adjusting a beta value of the at least one superconducting coupler device based on a magnitude of an angular deviation between the second portions of the first one and the second one of the superconducting devices from being parallel with one another.

A method of operation of a quantum processor, wherein the quantum processor includes a plurality of superconducting devices which are superconductive at or below threshold temperatures, a number of the superconducting devices having a respective loop and at least one respective Josephson junction interrupting the loop, for a first one and a second one of the superconducting devices which have respective loops that partially overlaps one another and are not electrically contiguous with one another, a first portion of the respective loop of at least the first one of the superconducting devices arranged perpendicularly with respect to a first portion of the respective loop of the second one of the superconducting devices and a second portion of the respective loop of at least the first one of the superconducting devices arranged non-perpendicularly with respect to a second portion of the respective loop of the second one of the superconducting devices to directly communicatively couple the first and the second superconducting devices without any intervening superconducting devices, and a superconducting coupler operable to communicatively couple the first and the second superconducting devices to one another may be summarized as including adjusting a beta value of the superconducting coupler that communicatively couples the first one and the second one of the superconducting devices to one another based at least in part on the non-perpendicular orientation of the second portion of the first one of the superconducting devices with respect to the second portion of the second one of the superconducting devices which are also directly communicatively coupled without any intervening superconducting devices or superconducting couplers; and communicatively coupling a signal to at least one of the first one or the second one of the superconducting devices. Adjusting a beta value of the superconducting coupler that communicatively couples the first one and the second one of the superconducting devices may include decreasing the beta value in the superconducting coupler. Adjusting a beta value in the superconducting coupler that communicatively couples the first one and the second one of the superconducting devices may include decreasing a magnitude of a persistent current in the superconducting coupler that communicatively couples the first one and the second one of the superconducting devices. Adjusting a beta value of the superconducting coupler that communicatively couples the first one and the second one of the superconducting devices may include adjusting a beta value of the superconducting coupler that communicatively couples the first one and the second one of the superconducting devices based on a magnitude of an angular deviation between the second portions of the first one and the second one of the superconducting devices from being perpendicular to one another. Adjusting a beta value of the superconducting coupler that communicatively couples the first one and the second one of the superconducting devices may include adjusting a beta value of the superconducting coupler that communicatively couples the first one and the second one of the superconducting devices based on a magnitude of an angular deviation between the second portions of the first one and the second one of the superconducting devices from being parallel with one another. The first one and the second one of the superconducting devices may be selected from the group comprising the following pairs: a pair of superconducting qubits, a superconducting qubit and another superconducting device, and a pair of loops of superconducting material communicatively coupled to each other as a QFP, a multiplier, or an L-tuner, and coupling a signal to at least one of the first one or the second one of the superconducting devices may include communicatively coupling a signal directly to one of two superconducting devices of the selected pair of superconducting devices. The loops may be elongated, each having a pair of parallel sides. The first portion of the first and the second ones of the superconducting devices may be portions of the parallel sides of the respective first portion of the first one and the second one of the superconducting devices.

The first superconducting device may be a first qubit and the second one of the superconducting devices may be a second qubit, and may further include communicatively coupling the first qubit with the second qubit via a coupler superconducting device, in addition to direct communicative coupling between the non-perpendicular portions of the first and the second ones of the superconducting devices.

The first superconducting device may be a first qubit and the second one of the superconducting devices may be a second qubit, and may further include adding a static signal to a mutual inductance of the coupling device.

A quantum processor apparatus may be summarized as including a plurality of superconducting devices which are superconductive at or below threshold temperatures, a number of the superconducting devices having a respective loop and at least one respective Josephson junction interrupting the loop, for a first one and a second one of the superconducting device which have respective loops that partially overlaps one another and are not electrically contiguous with one another, a first portion of the respective loop of at least the first one of the superconducting devices arranged perpendicularly with respect to a first portion of the respective loop of the second one of the superconducting devices and a second portion of the respective loop of at least the first one of the superconducting devices arranged non-perpendicularly with respect to a second portion of the respective loop of the second one of the superconducting devices to directly communicatively couple the first and the second superconducting devices without any intervening superconducting devices, and at least one of the first one or the second one of the superconducting devices directly communicatively coupled to one another via a third one of the superconducting devices that has a beta value adjusted based at least in part on the non-perpendicular orientation of the second portion of the first one of the superconducting devices with respect to the second portion of the second one of the superconducting devices which are directly communicatively coupled without any intervening superconducting devices. The third one of the superconducting devices that communicatively couples the first one and the second one of the superconducting devices may have a respective decreased beta value. The third one of the superconducting devices that communicatively couples the first one and the second one of the superconducting devices may have a decreased magnitude of a persistent current. The third one of the superconducting devices that communicatively couples the first one and the second one of the superconducting devices may have a beta value adjusted based on a magnitude of an angular deviation between the second portions of the first one and the second one of the superconducting devices from being perpendicular to one another. The third one of the superconducting devices that communicatively couples the first one and the second one of the superconducting devices may have a beta value adjusted based on a magnitude of an angular deviation between the second portions of the first one and the second one of the superconducting devices from being parallel with one another. The first one and the second one of the superconducting devices may be selected from the group comprising the following pairs: a pair of superconducting qubits, a superconducting qubit and another superconducting device, and a pair of loops of superconducting material communicatively coupled to each other as a QFP, a multiplier, or an L-tuner. The loops may be elongated, each having a pair of parallel sides. The first portion of the first and the second ones of the superconducting devices may be portions of the parallel sides of the respective first portion of the first one and the second one of the superconducting devices. A crossing geometry of the first and the second superconducting devices may be altered to make $M_{qu\text{-}qu}$ ferromagnetic, anti-ferromagnetic, or close to zero. Decreasing the beta value in the superconducting coupler may increase linearity of the superconducting coupler's response to an applied flux bias. Decreasing the beta value in the superconducting coupler may increase linearity of the superconducting coupler's response to an applied flux bias thereby increasing tunability of the superconducting coupler

BRIEF DESCRIPTION OF THE SEVERAL VIEWS OF THE DRAWING(S)

In the drawings, identical reference numbers identify similar elements or acts. The sizes and relative positions of elements in the drawings are not necessarily drawn to scale. For example, the shapes of various elements and angles are not drawn to scale, and some of these elements are arbitrarily enlarged and positioned to improve drawing legibility. Further, the particular shapes of the elements as drawn are not intended to convey any information regarding the actual shape of the particular elements, and have been solely selected for ease of recognition in the drawings.

FIG. 3a is a schematic diagram of another pair of communicatively coupled superconducting devices with direct coupling induced between the pair of superconducting devices, in accordance with the present systems and methods.

DETAILED DESCRIPTION

Figure 1:
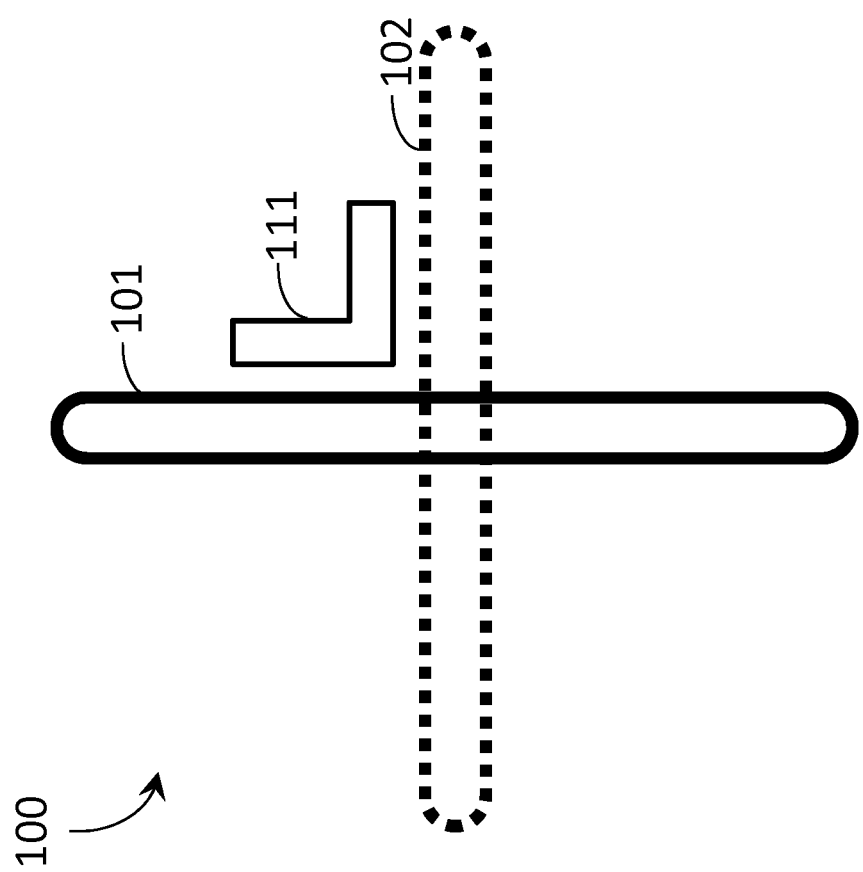
FIG. 1 is a schematic diagram of a pair of superconducting devices communicatively coupled together by a coupling device with no direct coupling induced between the two superconducting devices, according to at least one illustrated embodiment.

In the following description, certain specific details are set forth in order to provide a thorough understanding of various disclosed embodiments. However, one skilled in the relevant art will recognize that embodiments may be practiced without one or more of these specific details, or with other methods, components, materials, etc. In other instances, well-known structures associated with quantum processors, qubits, couplers, controller, readout devices and/or interfaces have not been shown or described in detail to avoid unnecessarily obscuring descriptions of the embodiments.

Unless the context requires otherwise, throughout the specification and claims which follow, the word "comprise" and variations thereof, such as, "comprises" and "comprising" are to be construed in an open, inclusive sense, that is as "including, but not limited to."

Reference throughout this specification to "one example", "an example", "one embodiment" or "an embodiment" means that a particular feature, structure or characteristic described in connection with the embodiment is included in at least one embodiment. Thus, the appearances of the phrases "in one example", "in an example", "in one embodiment" or "in an embodiment" in various places throughout this specification are not necessarily all referring to the same embodiment. Furthermore, the particular features, structures, or characteristics may be combined in any suitable manner in one or more embodiments.

As used in this specification and the appended claims, the singular forms "a," "an," and "the" include plural referents unless the content clearly dictates otherwise. It should also be noted that the term "or" is generally employed in its sense including "and/or" unless the content clearly dictates otherwise.

As used in this specification and the appended claims, the terms "overlap," "overlapping" and the like, mean a projection of a boundary of the recited structure with respect to the boundary of another structure, and includes overlying with and without intervening items between the recited structures. For example, one loop may overlap a loop on the next wiring layer below, or two wiring layers below, and the like. The terms "overlap," "overlapping" and the like apply without respect to orientation, that is without respect to whether one structure resides above or below another structure.

The headings and Abstract of the Disclosure provided herein are for convenience only and do not interpret the scope or meaning of the embodiments.

As previously described, increasing the critical current of a coupling device increases the coupler beta, which increases the slope of the coupler susceptibility in the ferromagnetic region. Therefore, increasing the critical current of a coupling device may only increase $M_{AFM}$ with diminishing returns as the coupler susceptibility is non-linear. Therefore, instead of increasing the coupler critical current, a direct coupling may be applied between the bodies of a pair of superconducting devices which the coupling device couples. The two superconducting devices that the coupling device couples may be a pair of superconducting qubits, a superconducting qubit and another superconducting device or any pair of loops of superconducting material that may be coupled to each other such as, superconducting qubits, Quantum Flux Parametrons (QFPs), multipliers, L-tuners, etc. In other words, any pair of superconducting devices each of which comprises a loop of superconducting material interrupted by at least one Josephson junction may be configured to induce a direct coupling between the pair of superconducting devices. A detailed description of such other superconducting devices is given in, for example, U.S. Pat. Nos. 8,169,231, 7,843,209, and US Patent Publications 2011-0057169 A1 and 2011-0060780 A1. Those of skill in the art have attempted to minimize this stray coupling which is also known as "crosstalk". However, by adding a known anti-ferromagnetic, or ferromagnetic coupling $M_{qu-qu}$ directly between two communicatively coupled superconducting devices, the asymmetric susceptibility of the coupling device may be leveraged. For example, the $M_{AFM}$ has an upper limit of $M_1 M_2 X_{AFM}$ but a much stronger ferromagnetic coupling may be realized with the addition of direct coupling $M_{qu-qu}$ which would change Equation $M_{AFM} = M_1 M_2 X_{AFM}$ (4) to:

$$M_{AFM} = M_1 M_2 X_{AFM} + M_{qu-qu}. \quad (6)$$

A direct coupling may be added between a pair of communicatively coupled superconducting devices by engineering the geometry of the two communicatively coupled superconducting devices in a way in which a ferromagnetic, or anti-ferromagnetic coupling is directly induced by one superconducting device to the other superconducting device. For example, by altering the crossing geometry of two qubits where each qubit comprises a loop of superconducting material interrupted by at least one Josephson junction, the direct coupling $M_{qu-qu}$ may be made anti-ferromagnetic, ferromagnetic or close to zero.

The various embodiments described herein provide systems and methods for increasing the energy scale of a quantum processor by adding a direct static coupling between a pair of coupler-mediated, communicatively coupled superconducting devices as well as by increasing the linearity of the response/susceptibility of the coupling devices in a quantum processor. As an illustrative example, a superconducting quantum processor designed to perform adiabatic quantum computation and/or quantum annealing is used in the description that follows. However, a person of skill in the art will appreciate that the present systems and methods may be applied to any form of quantum processor hardware implementing any form of quantum algorithm(s) (e.g., adiabatic quantum computation, quantum annealing, gate/circuit-based quantum computing, etc.).

In accordance with some embodiments of the present systems and devices, a quantum processor may be designed to perform adiabatic quantum computation and/or quantum annealing. An evolution Hamiltonian is proportional to the sum of a first term proportional to the problem Hamiltonian and a second term proportional to the disordering Hamiltonian. As previously discussed, a typical evolution may be represented by Equation (7):

$$H_E \propto A(t) H_D + B(t) H_P \quad (7)$$

where $H_P$ is the problem Hamiltonian, disordering Hamiltonian is $H_D$, $H_E$ is the evolution or instantaneous Hamiltonian, and A(t) and B(t) are examples of an evolution coefficient which controls the rate of evolution. In general, evolution coefficients vary from 0 to 1. In some embodiments, a time varying envelope function is placed on the problem Hamiltonian. A common disordering Hamiltonian is shown in Equation (8):

$$H_D \propto -\frac{1}{2} \sum_{i=1}^{N} \Delta_i \sigma_i^x \quad (8)$$

where N represents the number of qubits, $\sigma_i^x$ is the Pauli x-matrix for the $i^{th}$ qubit and $\Delta_i$ is the single qubit tunnel splitting induced in the $i^{th}$ qubit. Here, the $\sigma_i^x$ terms are examples of "off-diagonal" terms. A common problem Hamiltonian includes first component proportional to diagonal single qubit terms and a second component proportional to diagonal multi-qubit terms. The problem Hamiltonian, for example, may be of the form:

$$H_P \propto -\frac{\varepsilon}{2} \left[ \sum_{i=1}^{N} h_i \sigma_i^z + \sum_{j>i}^{N} J_{ij} \sigma_i^z \sigma_j^z \right] \quad (9)$$

where N represents the number of qubits, $\sigma_i^z$ is the Pauli z-matrix for the $i^{th}$ qubit, $h_i$ and $J_{i,j}$ are dimensionless local fields for the qubits, and couplings between qubits, and $\varepsilon$ is some characteristic energy scale for $H_P$. Here, the $\sigma_i^z$ and $\sigma_i^z \sigma_j^z$ terms are examples of "diagonal" terms. The former is a single qubit term and the latter a two qubit term. Throughout this specification, the terms "problem Hamiltonian" and "final Hamiltonian" are used interchangeably. Hamiltonians such as $H_D$ and $H_P$ in Equations (8) and (9), respectively, may be physically realized in a variety of different ways. A particular example is realized by an implementation of superconducting qubits.

FIG. 1 shows a schematic diagram of an exemplary scheme 100 of a pair of superconducting devices 101 and 102 communicatively coupled together by a coupling device 111 with no direct coupling induced between the two superconducting devices. Superconducting device 101 is drawn with a thick solid line while superconducting device 102 is drawn with a dotted line to better represent the crossing geometry of superconducting devices 101 and 102. In the illustration, the superconducting device 101 crosses superconducting device 102 substantially perpendicularly. Coupler 111 communicatively couples superconducting device 101 and 102 together via a mutual inductance.

Superconducting devices 101 and 102 may each comprise a loop of superconducting material interrupted by at least one Josephson junction (not shown). For example, superconducting devices 101 and 102 may be a pair of superconducting qubits, a superconducting qubit and another superconducting device communicatively coupled to the superconducting qubit by coupler 111, or any other suitable combination of a pair of communicatively coupled superconducting devices. Such a superconducting device may include for example, superconducting qubits, QFPs, multipliers, L-tuners, etc. Therefore, from hereon, it is assumed that a pair of superconducting devices communicatively coupled by a coupling device represents a pair of superconducting qubits, a superconducting qubit communicatively coupled to another superconducting device such as a QFP, multiplier, L-tuner and so on or any other suitable configuration of a pair of communicatively coupled superconducting devices. A superconducting device may be a loop of superconducting material interrupted by at least one Josephson junction such that a pair of such superconducting loops may be communicatively coupled by a coupling device.

Since superconducting device 101 is placed substantially perpendicular to superconducting device 102, a mutual inductance $M_{qu-qu}$ may not be induced by superconducting device 101 to superconducting device 102 or by superconducting device 102 to superconducting device 101. Therefore, according to this geometry, the mutual inductance between the two communicatively coupled superconducting devices 101 and 102 may be similar to Equation (4).

As previously described, a direct coupling may be induced between a pair of superconducting devices each comprising a loop of superconducting material by altering the geometry of the superconducting devices. For example, altering a portion of a superconducting loop comprised in a superconducting device such that a portion of the superconducting loop is placed at a non-orthogonal angle to a portion of another superconducting loop comprised in another superconducting device that is communicatively coupled to the superconducting device by a coupling device, induces a crosstalk between the two superconducting loops which may be controllably added to the mutual inductance of the two communicatively coupled superconducting loops. This may increase the energy scale of the quantum processor. Therefore, an otherwise unwanted crosstalk that may be induced between a pair of superconducting devices may be advantageously used for controllably increasing the energy scale of a quantum processor.

Figure 2:
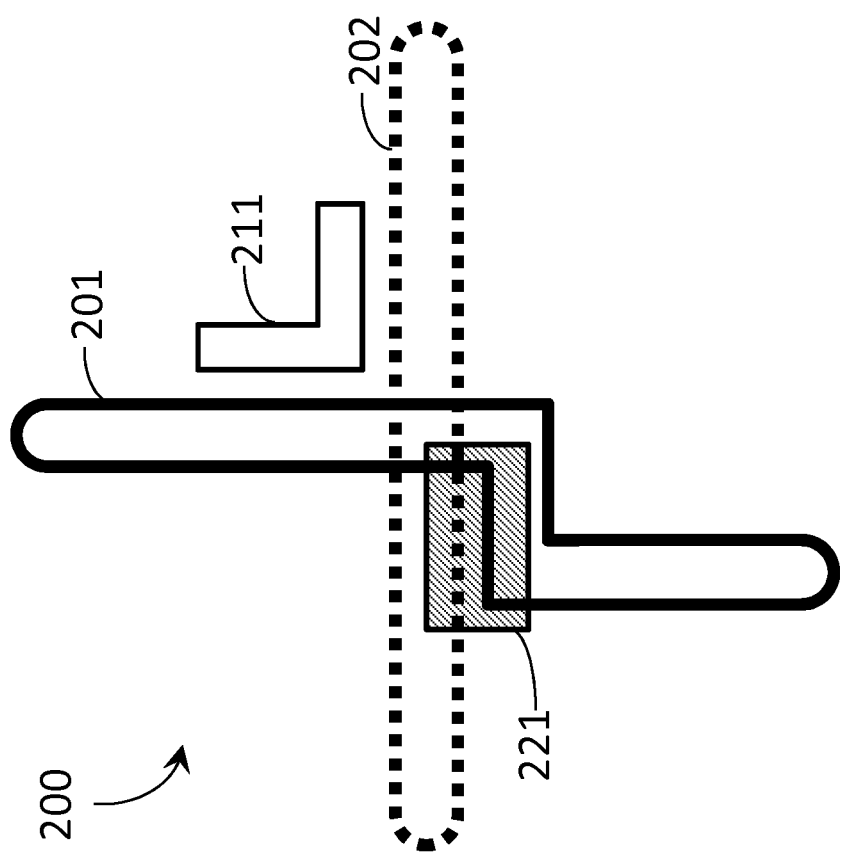
FIG. 2 is a schematic diagram of a pair of superconducting devices communicatively coupled together by a coupling device with direct coupling induced between the pair of superconducting devices, in accordance with the present systems and methods.

FIG. 2 shows a schematic diagram of an exemplary scheme 200 of a pair of superconducting devices 201, 202 communicatively coupled together by a coupling device 211. Superconducting device 201 is drawn with a thick solid line while superconducting device 202 is drawn with a dotted line to better represent the crossing geometry of superconducting devices 201 and 202. Unlike in FIG. 1, a portion of superconducting device 201 is placed substantially parallel (e.g., at a non-orthogonal angle) to superconducting device 202 at approximately shaded region 221 which may induce a mutual inductance $M_{qu-qu}$ (i.e., direct coupling) between superconducting device 201 and 202. That is, a portion of superconducting device 201 has a jog to place the portion substantially parallel to superconducting device 202. Alternatively it can be said the superconducting device 201 includes a pair of legs that in part define a respective loop one or both of the legs has a Z-shape. Region 221 is shaded in FIG. 2 to improve drawing legibility. In addition to this induced mutual inductance, coupling device 211 coupling superconducting device 201 and 202 together provides a mutual inductance $M_{AFM}$ as in FIG. 1. Here the induced mutual inductance provides an antiferromagnetic coupling. Therefore, the total mutual inductance now includes $M_{AFM}$ as given in Equation (4) plus $M_{qu-qu}$ induced between superconducting device 201 and 202 at region 221 which is similar to Equation (6).

As previously described, superconducting devices 201 and 202 may each comprise a loop of superconducting material interrupted by at least one Josephson junction. (Josephson junctions of superconducting devices 201 and 202 are not shown to reduce clutter). Therefore, superconducting devices 201 and 202 may be for example a pair of communicatively coupled qubits or any such superconducting devices. Therefore, the present systems and methods may be applied for any two superconducting devices each comprising a loop of superconducting material interrupted by at least one Josephson junction that may need tunable inductive coupling between the two superconducting devices. The orientation of the direct coupling induced between superconducting device 201 and 202 at approximately region 221 may change according to the direction of the flow of current in the superconducting loop comprised in each superconducting device 201, 202. In other words, the crossing geometry of superconducting device 201 and 202 (e.g., at region 221) may be altered to make $M_{qu-qu}$ ferromagnetic, anti-ferromagnetic, or close to zero.

Figure 3B:
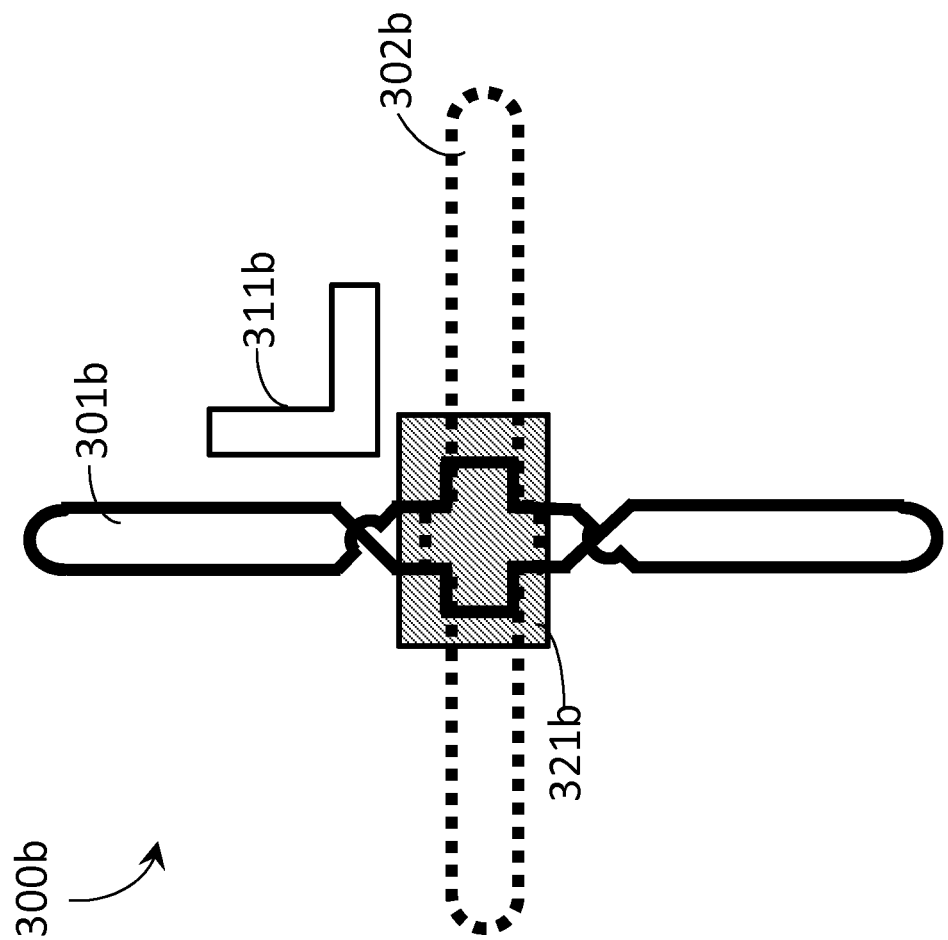
FIG. 3b is a schematic diagram of yet another pair of communicatively coupled superconducting devices with direct coupling induced between the pair of superconducting devices, in accordance with the present systems and methods.

FIG. 3a and FIG. 3b show a schematic diagram of two other exemplary schemes 300a and 300b respectively. Superconducting devices 301a and 302a are communicatively coupled together by coupling device 311a in FIG. 3a. Similarly, in FIG. 3b superconducting device 301b is communicatively coupled to superconducting device 302b by coupling device 311b. Superconducting devices 301a and 301b are drawn with a thick solid line while superconducting devices 302a and 302b are drawn with a dotted line to better represent the crossing geometries of superconducting devices 301a, 302a and 301b, 302b. The crossing geometry of superconducting devices 301a and 302a of FIG. 3a at approximately shaded region 321a produces a direct coupling (i.e., $M_{qu-qu}$) between the bodies of superconducting devices 301a and 302a. Similarly, the crossing geometry of superconducting devices 301b and 302b of FIG. 3b at approximately shaded region 321b produces a direct coupling (i.e., $M_{qu-qu}$) between the bodies of superconducting devices 301b and 302b. Regions 321a of FIGS. 3a and 321b of FIG. 3b are shaded to improve drawing legibility. FIG. 3a and FIG. 3b include examples of "negative" areas, which are indicated via shading. Negative area, as used herein, denotes an area with a normal vector indicative of inductance where a direction of that normal vector is opposite in orientation to a direction of a normal vector indicative of inductance through some other area (i.e., "positive" area). The naming convention of an area as being either positive or negative is based on any desired convention, since it is the respective orientations of one area to the other that matters. For example, superconducting device 301a includes two twists so that its area approximately in the shaded region 321a has the opposite orientation to the remainder of superconducting device 301a and superconducting device 302a. The overlap provides an induced mutual inductance. This mutual inductance provides a ferromagnetic coupling. The shaded region 321b shows a similar example. The size of this are maybe be increased by increasing the absolute value of the overlapping area. As previously described this direct coupling produced between the bodies of the two communicatively coupled superconducting devices (e.g., superconducting device 301a and 302a of FIG. 3a) may be ferromagnetic, anti-ferromagnetic or substantially equal to zero.

Figure 3C:
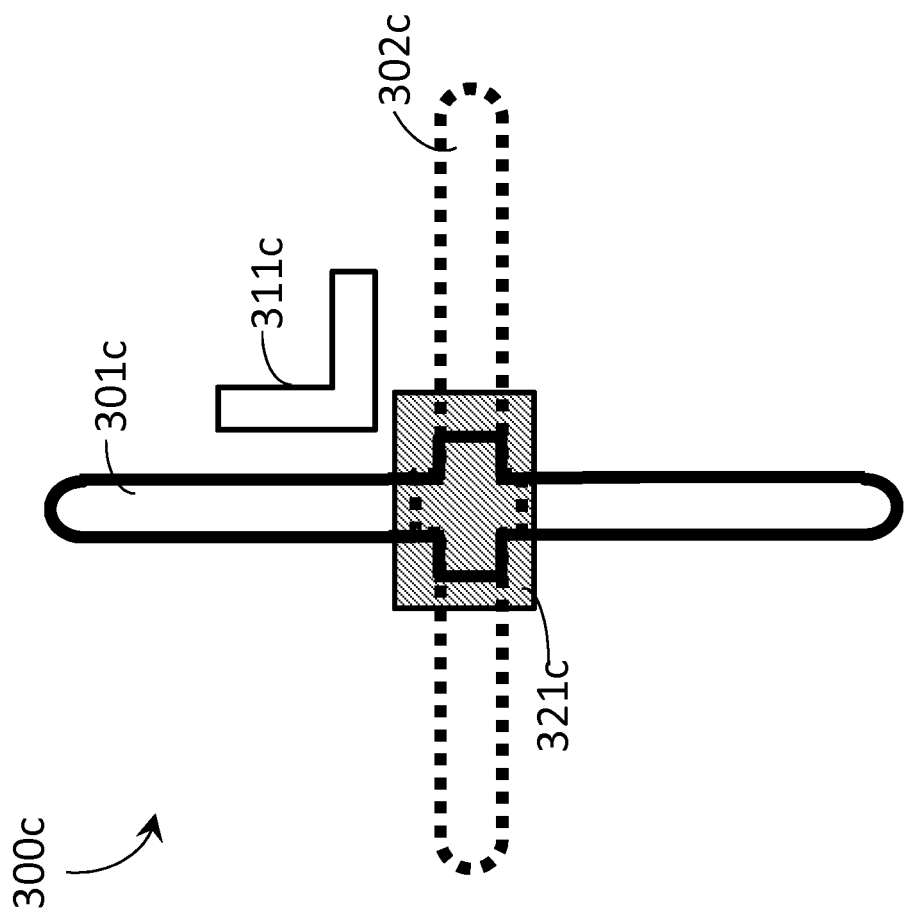
FIG. 3c is a schematic diagram of another pair of communicatively coupled superconducting devices with direct coupling induced between the pair of superconducting devices, in accordance with the present systems and methods.

FIG. 3c is a schematic diagram of another pair of communicatively coupled superconducting devices 300c. The pair of superconducting devices 300c are directly communicatively coupled. FIG. 3c includes superconducting devices 301c and 302c are communicatively coupled together by coupling device 311c and by a shared positive area within shaded region 321c. The crossing geometry of superconducting devices 301c and 302c within approximately shaded region 321c produces a direct coupling (i.e., $M_{qu-qu}$) between the bodies of superconducting devices 301c and 302c. Here the induced mutual inductance provides an antiferromagnetic coupling.

Figure 4:
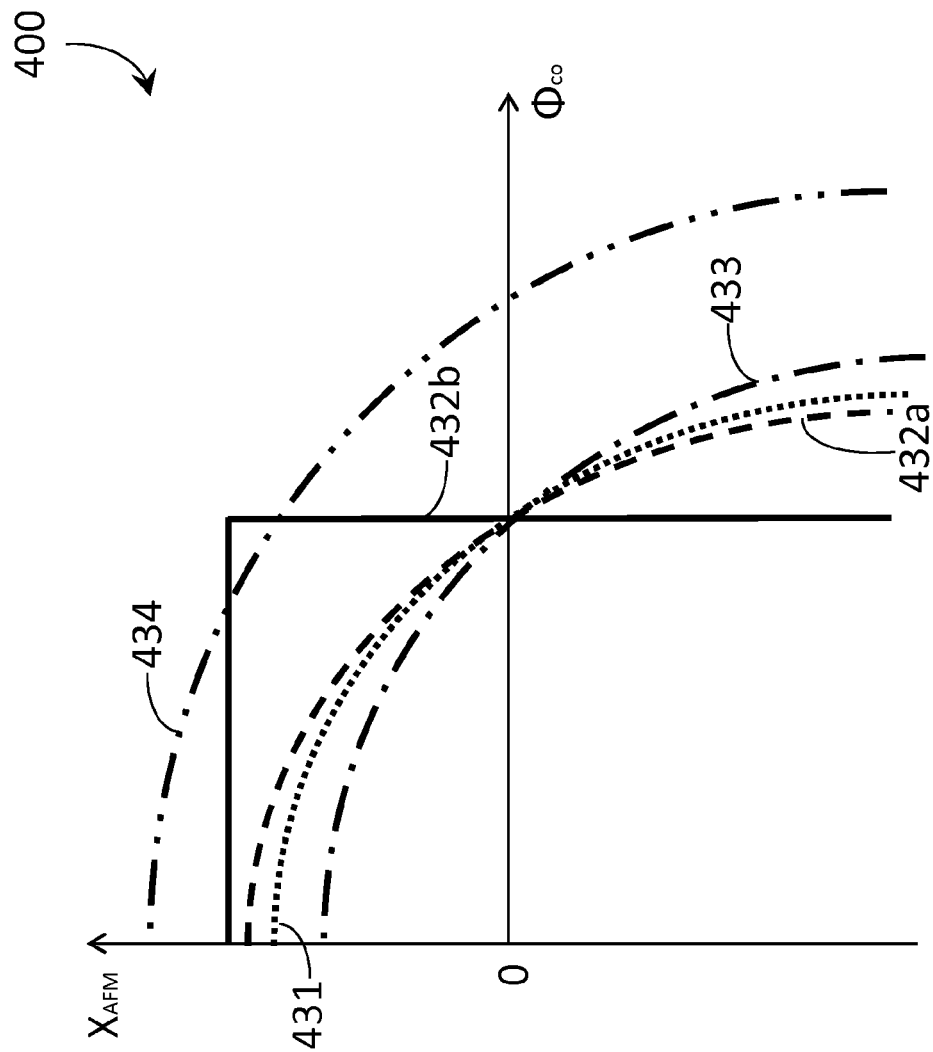
FIG. 4 is a graph which plots exemplary susceptibility curves of a coupler at several different scenarios, in accordance with the present systems and methods.

FIG. 4 shows exemplary plot 400 of susceptibility curves of a coupler at several different scenarios. The x-axis in FIG. 4 indicates the flux bias ($\phi_{co}$) of a coupling device and the y-axis in FIG. 4 indicates the corresponding susceptibility (X) of the coupling device. The values of both x- and y-axes in FIG. 4 may solely depend on the actual physical parameters of the present systems and methods. The purpose of FIG. 4 is to show the general shape of susceptibility curves 431, 432a, 432b, 433, 434 each representing the response of a coupling device at a particular configuration of a pair of superconducting device the coupling device couples. The highest point along the y-axis may indicate the maximum anti-ferromagnetic coupling strength (i.e., mutual inductance, $M_{AFM}$) that may be achieved by anti-ferromagnetically coupling a pair of superconducting devices by a coupling device. Similarly, the lowest point along the y-axis may indicate the maximum ferromagnetic coupling strength (i.e., mutual inductance, $M_{FM}$) that may be achieved by ferromagnetically coupling a pair of superconducting devices by a coupling device. Point "0" on the y-axis indicates zero or no coupling.

Susceptibility curve 431 indicates the susceptibility of a pair of superconducting devices communicatively coupled by a coupling device (e.g., superconducting devices 101, 102 and coupling device 111 as shown in FIG. 1). Coupling device 111 may be placed proximate the portion of superconducting device 101 that crosses superconducting device 102 such that superconducting device 101 may be coupled to superconducting device 102. As indicated in susceptibility curve 431, the susceptibility of a coupler (for example, coupler 111) changes rapidly in the ferromagnetic region (i.e., below y=0). Therefore, a small change in the coupler's flux bias may have a large effect on the susceptibility of the coupler when the pair of superconducting devices (for example, superconducting devices 101, 102) are ferromagnetically coupled by the coupling device (for example, coupling device 111). Therefore, the response of the coupler to a change in the coupler's flux bias ($\phi_{co}$) is not linear which makes it difficult to achieve tunability of the coupler.

An intention of the present systems and methods is to increase the energy scale of a quantum processor as well as to increase the linearity of a coupler response such that strong coupling may be achieved between communicatively coupled superconducting devices and the coupling devices that couple such superconducting devices may be more tunable. As previously described, increasing the critical current $I_c$ of the coupler will increase $X_{AFM}$ to an upper limit of $1/L_{co}$. However, increasing the critical current of a coupling device also increases the coupler beta ($\beta$) given by Equation (5) which increases the slope of the coupler susceptibility in the ferromagnetic region. Susceptibility curve 432a indicates the relative change in susceptibility that may be encountered when the critical current of the coupler is increased (e.g., critical current of coupler 111 of FIG. 1). As seen in FIG. 4, the maximum susceptibility in the anti-ferromagnetic region (y>0) has increased which indicates that the coupling device may more strongly anti-ferromagnetically couple a pair of superconducting devices than in susceptibility curve 431. However, in the ferromagnetic region, susceptibility curve 432a is steeper than susceptibility curve 431 which may further reduce the tunability of the coupler. As the critical current is increased, the susceptibility curve may eventually saturate to an upper limit of $1/L_{co}$ at a given $X_{AFM}$. This saturation is shown by susceptibility curve 432b where there may be essentially no tunability of the coupling device in the ferromagnetic region (i.e., susceptibility drops dramatically independent of the flux bias of the coupler).

It may be advantageous to lower the $\beta$ of a coupling device in order to realize higher precision ferromagnetic coupling. The $\beta$ of a coupling device may be reduced by lowering the critical current of the coupling device by for example a programming subsystem or the inductance of the coupling device by for example reducing the length of the superconducting loop comprised in the coupling device. Susceptibility curve 433 indicates the susceptibility of a coupling device (e.g., coupler 111 of FIG. 1) when $\beta$ of the coupling device is decreased. As shown in FIG. 4, susceptibility curve 433 is more linear than susceptibility curves 431, 432a and 432b which may indicate that a coupling device with a lower $\beta$ than the coupling devices represented by susceptibility curves 431, 432a and 432b is more tunable in the ferromagnetic region. In other words, susceptibility curve 433 shows that a change in flux bias ($\phi_{co}$) of the coupling device may not change the susceptibility of the coupling device dramatically. Therefore, reducing $\beta$ of a coupling device may increase the linearity of a coupler's response to a change in the coupler's flux bias ($\phi_{co}$). However, as indicated by susceptibility curve 433, lowering $\beta$ may also lower the susceptibility of the coupling device. Therefore, adding a static signal to the mutual inductance of the coupling device may boost susceptibility curve 433 to susceptibility curve 434. In other words, susceptibility curve 434 represents a relative susceptibility curve that may be achieved by configuring a pair of communicatively coupled superconducting devices to induce a direct coupling between the bodies of the superconducting devices in addition to the coupling established between the pair of superconducting device by a coupling device. For example, superconducting device 201 which is communicatively coupled to superconducting device 202 by coupling device 211 placed proximate the portion of superconducting device 201 that crosses the portion of superconducting device 202 is placed at a non-orthogonal angle with another portion of superconducting device 202 at approximately region 221 to create a direct device-to-device magnetic flux (i.e., direct coupling $M_{qu\text{-}qu}$) between superconducting devices 201 and 202. This direct coupling may be induced between the bodies of superconducting devices 201 and 202 as a result of a portion of superconducting device 201 being non-orthogonal to a portion of superconducting device 202.

Crosstalk controllably added to increase the coupling strength between a pair of superconducting devices communicatively coupled by a coupling device. In general, this type of direct coupling that may be encountered between the bodies of a pair of communicatively coupled superconducting devices as a result of for example, fabrication non-idealities as well as human error which is called a "crosstalk" has been considered to negatively affect the performance of the superconducting devices. However, by configuring the physical dimensions of a superconducting device, a direct device-to-device coupling may be controllably added to the coupling between a pair of superconducting devices (e.g., superconducting devices 201, 202) established by coupling device (e.g., coupling device 211) to increase the coupling strength of the pair of superconducting devices. Susceptibility curve 434 shows this increased coupling strength achieved between a pair of communicatively coupled superconducting devices by a coupling device with an added direct device-to-device coupling $M_{qu\text{-}qu}$. In other words, a crosstalk that may otherwise be attempted to minimize/eliminate may be controllably added to advantageously increase the coupling strength between a pair of superconducting devices communicatively coupled by a coupling device. Furthermore, susceptibility curve 434 indicates that the response of the coupling device is more linear than the response of a coupling device indicated by susceptibility curves 431, 432a and 432b in the ferromagnetic region. This is due to lowering the coupler $\beta$ as was described with reference to susceptibility curve 433. FIGS. 3a, 3b, and 3c show three other configurations of a pair of communicatively coupled superconducting devices with an added $M_{qu-qu}$. Such superconducting devices, as previously described may each comprise a loop of superconducting material interrupted by at least one Josephson junction and may include superconducting qubits and other devices such as QFPs, multipliers, L-tuners, etc.

Increasing the coupling strength between a pair of communicatively coupled superconducting devices may increase the overall energy scale of a quantum processor which comprises such pairs of communicatively coupled qubits. For example, in the anti-ferromagnetic region, increasing $M_{AFM}$ as shown in Equation (4) may increase the energy scale of the quantum processor.

Figure 5:
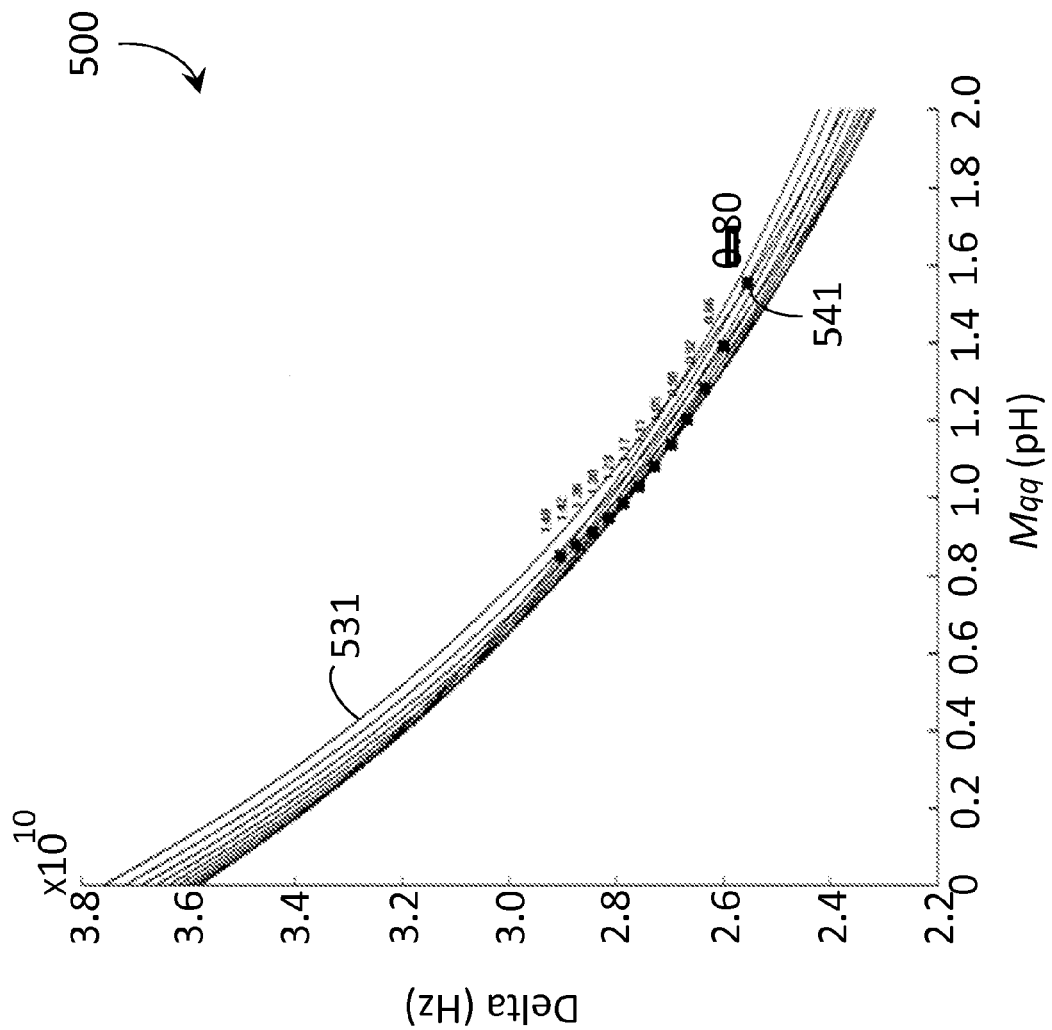
FIG. 5 is a graph which plots exemplary amount of direct device-to-device coupling necessary to achieve a nominal target of $M_{AFM}=2$ pH for a range of $\beta$ of a coupling device that communicatively couples a pair of superconducting devices, in accordance with the present systems and methods.

FIG. 5 shows an exemplary plot 500 showing the amount of direct device-to-device coupling necessary to achieve a nominal target of $M_{AFM}$=2 pH for a range of β of a coupling device that communicatively couples a pair of superconducting devices together. The x-axis in FIG. 5 indicates the necessary $M_{qu-qu}$ needed and the y-axis in FIG. 5 indicates the coupler's energy scale. The values of both x- and y-axes in FIG. 5 may solely depend on the actual physical parameters of the coupling device and the superconducting devices the coupling device couples as well as the coupling geometry of the pair of superconducting devices. The purpose of FIG. 5 is to show the $M_{qu-qu}$ required to achieve $M_{AFM}$=2 pH for a range of coupler β. The squares in FIG. 5 along with their corresponding values represent the coupler β for each curve 531 (only curve 531 and its corresponding square 541 are called out in FIG. 5 to reduce clutter). For example, to achieve 2 pH of $M_{AFM}$, approximately 1.55 pH of $M_{qu-qu}$ and a coupler β of 0.80 may be required. Therefore, $M_{qu-qu}$ is a controllable parameter that may be calculated using Equation (4). As previously described, the β of the coupling device may be adjusted by adjusting the critical current or the inductance of the coupling device.

Examples of the present present systems and methods taught herein include a range of physical parameters for mutual inductances amongst superconducting devices. In some examples, the value of $M_{qu-qu}$ is dominant contribution to $M_{AFM}$. That is $M_{qu-qu}$ is greater than $M_1 M_2 X_{AFM}$. For example, about 1.5 pH versus 0.5 pH. In some examples of the present invention $M_{qu-qu}$ ranges from more than 0 to 10 pico-Henries. In some examples, the value is between 0.2 and 2.0 pico-Henries. In some examples, the mutual inductance between the coupler and the first superconducting device ($M_1$) is about 9 pH. In some examples, the mutual inductance between the coupler and the second superconducting device ($M_1$) is about 13 pH. The differences in mutual inductance may come from the specific geometry of the overlapping area. For example when the overlap is negative the negative portion a superconducting may be on a more distant wiring layer to the coupler. In some examples, the value of $M_{qu-qu}$ is a more minor contribution to $M_{AFM}$.

Figure 6:
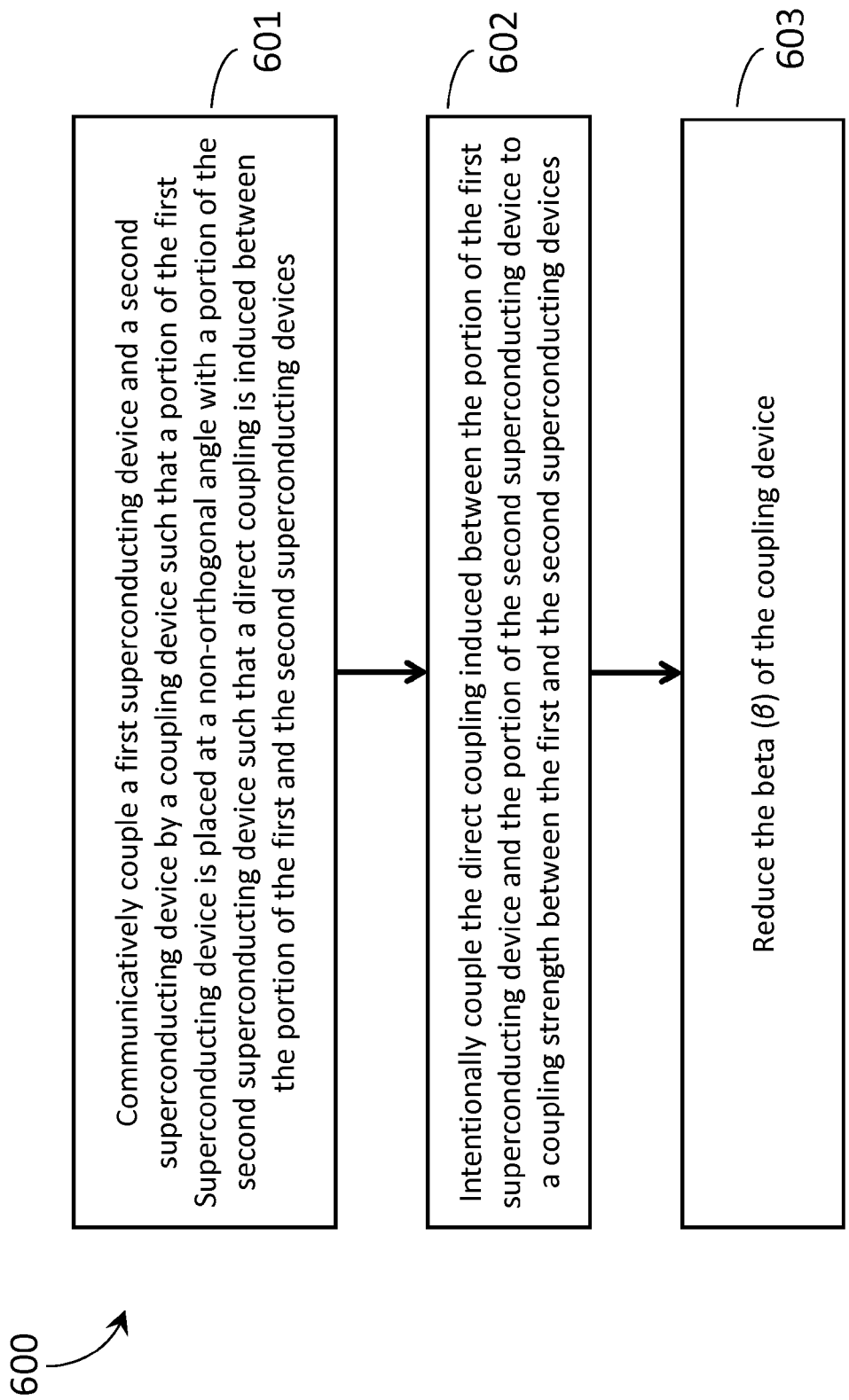
FIG. 6 is a flow diagram showing a method for increasing the energy scale of a quantum processor while increasing the linearity of the response of the coupling devices comprised in a quantum processor, accordance with the present systems and methods.

FIG. 6 shows a method 600 for increasing the energy scale of a quantum processor while increasing the linearity of the response of the coupling devices comprised in the quantum processor. Method 600 includes three acts 601-603, though those of skill in the art will appreciate that in alternative embodiments certain acts may be omitted and/or additional acts may be added. Those of skill in the art will appreciate that the illustrated order of the acts is shown for exemplary purposes only and may change in alternative embodiments.

At 601, a first superconducting device is communicatively coupled to a second superconducting device by a first coupling device such that a first portion of the first superconducting device crosses a first portion of the second superconducting device and a second portion of the first superconducting device is placed at a non-orthogonal angle with a second portion of the second superconducting device. The second portion of the first superconducting device placed at a non-orthogonal angle with the second portion of the second superconducting device produces a direct coupling between the second portion of the first and second superconducting devices. For example, superconducting device 201 and superconducting device 202 of FIG. 2 induce a direct coupling (i.e., $M_{qu-qu}$) between the bodies of superconducting devices 201 and 202 at approximately region 221 as a result of superconducting device 201 being placed at a non-orthogonal angle with superconducting device 202 at approximately region 221.

At 602, the direct coupling ($M_{qu-qu}$) of 601 is intentionally coupled together with a coupling strength between the first and second superconducting devices established by a coupling device (e.g., coupling device 211 of FIG. 2). The total anti-ferromagnetic mutual inductance ($M_{AFM}$) that may be achieved by coupling $M_{qu-qu}$ to the mutual inductance of the pair of superconducting devices communicatively coupled by a coupling device is given by Equation (6). Compared to Equation (4), the additional term $M_{qu-qu}$ in Equation (6) resulting from the direct coupling induced between a pair of communicatively coupled superconducting devices when a portion of one of the superconducting devices is placed at a non-orthogonal angle with a portion of the other superconducting device increases the overall coupling strength of the pair of communicatively coupled superconducting devices. As previously described, increasing $M_{AFM}$ increases the energy scale for specifying a problem Hamiltonian on a quantum processor. The scale is set by a factor proportional to $M_{AFM} I_p^2$. Therefore, method 600 may be used to increase the energy scale of a quantum processor.

At 603, the β of a coupling device comprised in the quantum processor is reduced. The β of a coupling device may be decreased by lowering the critical current $I_c$ of the coupling device via for example a programming subsystem or by lowering the inductance of the coupling device by for example reducing the physical size of the coupling device. Decreasing the β of a coupling device given in Equation (4) increases the linearity of the coupler's response to a change in the flux bias ($\phi_{co}$) of the coupling device, particularly in the ferromagnetic region. Susceptibility curve 433 of FIG. 4 shows the increased linear response of a coupling device when the β of the coupling device is decreased. However, $M_{qu-qu}$ needs to be increased when the β of the coupling device is decreased in order to achieve a target $M_{AFM}$. In other words, $M_{qu-qu}$ needs to be increased when the β of the coupling device is decreased in order to achieve a large-as-possible $M_{AFM}$ that may otherwise be achieved at 602. Therefore, 603 combined with 601-602 may be used to increase the energy scale of a quantum processor along with improved tunability of the coupling devices comprised in the quantum processor.

As previously described, increasing the linearity of a coupling device's response to a change in the coupling device's flux bias ($\phi_{co}$) may increase tunability of the coupling device. As described with reference to FIG. 4, when the susceptibility curve of a coupling device gets steeper (e.g., in the ferromagnetic region) the linearity of the susceptibility curve decreases. Hence, a small change in $\phi_{co}$ may have a large impact on the susceptibility of the coupling device which makes the coupling device less tunable. Decreasing the β of a coupling device may increase the linearity of the coupling device's response to a change in $\phi_{co}$ which may no longer have a large impact on the susceptibility of the coupling device. As such, the coupling device may be more tunable. Therefore, throughout this specification and the appended claims, the terms "tunable" or "tunability" when used to describe the response of a coupling device to a change in the coupling device's flux bias ($\phi_{co}$) describes the sensitivity of a coupling device with respect to $\phi_{co}$.

Throughout this specification and the appended claims, the term "susceptibility" when used to describe a property of for example "a coupling device" is used to describe how strongly a coupling device couples one superconducting device to another superconducting device. Any superconducting loop interrupted by at least one Josephson junction may have a susceptibility. The susceptibility of a superconducting loop interrupted by at least one Josephson junction (e.g., a coupling device) is set by a flux bias applied at the at least one Josephson junction of the superconducting loop (e.g., $\phi_{co}$ or $\phi_{CJJ}$) by for example a programming subsystem.

A superconducting device may comprise a loop of superconducting material interrupted by at least one Josephson junction. A superconducting device described throughout this specification and the appended claims may comprise qubits, QFPs, L-tuners, multipliers, and other such superconducting devices that comprise a loop of superconducting material interrupted by at least one Josephson junction. A pair of communicatively coupled superconducting devices may therefore comprise a pair of qubits, a qubit communicatively coupled to another superconducting device such as a QFP, L-tuner, multiplier, etc. or any other suitable combination of a pair of communicatively coupled superconducting devices. Superconducting devices such as QFPs, L-tuners, multipliers, etc. are described in, for example, U.S. Pat. Nos. 8,169, 231 and 7,843,209, and US Patent Publications 2011-0057169 A1 and 2011-0060780 A1.

As previously described, increasing $M_{AFM}$ may increase the energy scale of a quantum processor which may advantageously improve the performance of the quantum processor. Throughout this specification and the appended claims, the term "$M_{AFM}$" is used to describe the anti-ferromagnetic mutual inductance (i.e., a coupling strength) between a pair of superconducting devices anti-ferromagnetically coupled by a coupling device. Similarly, throughout this specification and the appended claims, the term "$M_{FM}$" is used to describe the ferromagnetic mutual inductance (i.e., a coupling strength) between a pair of superconducting devices ferromagnetically coupled by a coupling device.

Equation (4) shows that $M_{AFM}$ depends on the mutual inductance between the first superconducting device of the pair of communicatively coupled superconducting devices and the coupling device, the mutual inductance between the second superconducting device of the pair of communicatively coupled superconducting devices and the coupling device and the susceptibility of the coupling device. Changing the physical configuration of a pair of superconducting devices communicatively coupled by a coupling device as shown in FIGS. 2, 3a, 3b and 3c, adds an additional term $M_{qu-qu}$ to $M_{AFM}$ which is shown in Equation (6). $M_{qu-qu}$ may represent the mutual inductance induced directly between the pair of communicatively coupled superconducting devices without coupler-mediated coupling. Throughout this specification and the appended claims, this direct mutual inductance induced between the pair of superconducting devices may also be referred to as "direct coupling" or "direct static coupling." According to Equation (6), $M_{qu-qu}$ may increase $M_{AFM}$ which may increase the energy scale of the quantum processor and therefore improve performance of the quantum processor. Those of skill in the art have attempted to minimize this stray coupling which may also be known as a "crosstalk" arising from for example fabrication inaccuracies and human error. However, configuring the physical structure of a pair of communicatively coupled superconducting devices comprised in a quantum processor as described with reference to FIGS. 2, 3a, 3b and 3c advantageously adds a device-to-device direct coupling $M_{qu-qu}$ that may be controlled such that the overall mutual inductance (e.g., $M_{AFM}$) between the pair of communicatively coupled superconducting devices is maximized.

According to FIGS. 2, 3a, 3b and 3c at least a portion of a superconducting device is placed at a non-orthogonal angle with at least a portion of the other superconducting device. The respective portions of the pair of superconducting devices that are placed at a non-orthogonal angle with each other induce a device-to-device mutual inductance between the pair of superconducting devices. Throughout this specification and the appended claims, the term "non-orthogonal" is used to describe the angle between a portion of a superconducting device and a respective portion of another superconducting device communicatively coupled to the superconducting device that is not substantially equal 90 degrees. The angle between the respective portions of the pair of superconducting devices may for example be 10, 15, 30, 45, 60 degrees, etc.

FIG. 4 indicates that coupling devices have an asymmetric susceptibility which reduces the tunability of a coupling device for example in the ferromagnetic region. It may be useful therefore, to lower the beta ($\beta$) of the coupling device in order to realize benefits such as higher precision for ferromagnetic coupling. The beta ($\beta$) of a loop of superconducting material interrupted by at least one Josephson junction (e.g., a coupling device) is a convenience parameter that may be used for modeling purposes. Decreasing $\beta$ of a coupling device and controllably adding a direct coupling between a pair of superconducting devices communicatively coupled by the coupling device increases the energy scale of the quantum processor comprising a plurality of such pairs of communicatively coupled superconducting qubits and coupling devices while improving the tunability of the coupling devices.

Examples of the present systems and methods taught herein include a method for operating a quantum processor. The example method 1 is for a quantum processor that includes a plurality of superconducting devices which are superconductive at or below threshold temperatures, a number of the superconducting devices having a respective loop and at least one respective Josephson junction interrupting the loop, a first superconducting device in the plurality of superconducting devices and a second superconducting device in the plurality of superconducting devices have respective loops that partially overlap one another and are not electrically contiguous with one another. The example method 1 includes causing crosstalk between at least the first superconducting device and the second superconducting device in the plurality of superconducting devices to increase a coupling strength between the first superconducting device and the second superconducting device. Also the example method 1 includes communicatively coupling the first superconducting device and the second superconducting device via at least one superconducting coupling device.

An example method 2 like example method 1 including causing crosstalk between at least the first superconducting device and the second superconducting device in the plurality of superconducting devices. This method includes adjusting an inductance of the first superconducting device or the second superconducting device An example method 3 like example method 1 including adjusting an inductance of the first superconducting device or the second superconducting device that further includes decreasing an inductance of the first superconducting device or the second superconducting device. An example method 4 like example method 3 wherein decreasing an inductance of the first superconducting device or the second superconducting device includes decreasing a length of the respective loop in the at least one of the first superconducting device or the second superconducting device. An example method 5 like example method 4 including decreasing a length of the respective loop in the at least one of the first superconducting device or the second superconducting device. This method further includes decreasing a length during at least one of a design or a fabrication of the quantum processor over a length of a loop where the superconducting devices are substantially perpendicular to one another.

An example method 6 like example method 1 including causing crosstalk between at least the first superconducting device and the second superconducting device in the plurality of superconducting devices that further includes fabricating at least one of the first superconducting device and the second superconducting device to include a respective pair of parallel legs in the respective loop, each of the legs having a jog therein.

An example method 7 like example method 1 including causing crosstalk between at least the first superconducting device and the second superconducting device in the plurality of superconducting devices. The causing the cross talk is characterized by fabricating at least one of the first superconducting device and the second superconducting device to include a respective pair of legs in the respective loop, each of the legs having a Z-shape.

An example method 8 like example method 1 including causing crosstalk between at least the first superconducting device and the second superconducting device in the plurality of superconducting devices. This method includes adjusting a beta value of the at least one superconducting coupler device which communicatively couples the first superconducting device and the second superconducting device to one another based at least in part on the non-perpendicular orientation of a second portion of the first superconducting device with respect to a second portion of the second superconducting device.

An example method 9 like example method 8 including adjusting a beta value of the at least one superconducting coupler device. This adjusting includes decreasing the beta value in the at least one superconducting coupler device. An example method 10 like example method 8 wherein adjusting a beta value of the at least one superconducting coupler device includes decreasing a magnitude of a persistent current in the at least one superconducting coupler device that communicatively couples the first superconducting device and the second superconducting device. An example method 11 like example method 8 wherein adjusting a beta value of the at least one superconducting coupler device includes adjusting a beta value of the at least one superconducting coupler device based on a magnitude of an angular deviation between the second portions of the first superconducting device and the second superconducting device from being perpendicular to one another. An example method 11 like example method 8 that includes causing crosstalk between at least the first superconducting device and the second superconducting device in the plurality of superconducting devices. This causing crosstalk includes adjusting a beta value of the at least one superconducting coupler device based on a magnitude of an angular deviation between the second portions of the first superconducting device and the second superconducting device from being parallel with one another.

The example methods 1-12 include various acts. Those of skill in the art will appreciate that in alternative examples of these methods certain acts may be omitted and/or additional acts may be added. Those of skill in the art will appreciate that the illustrated order of the acts is shown for exemplary purposes only and may change.

Figure 7:
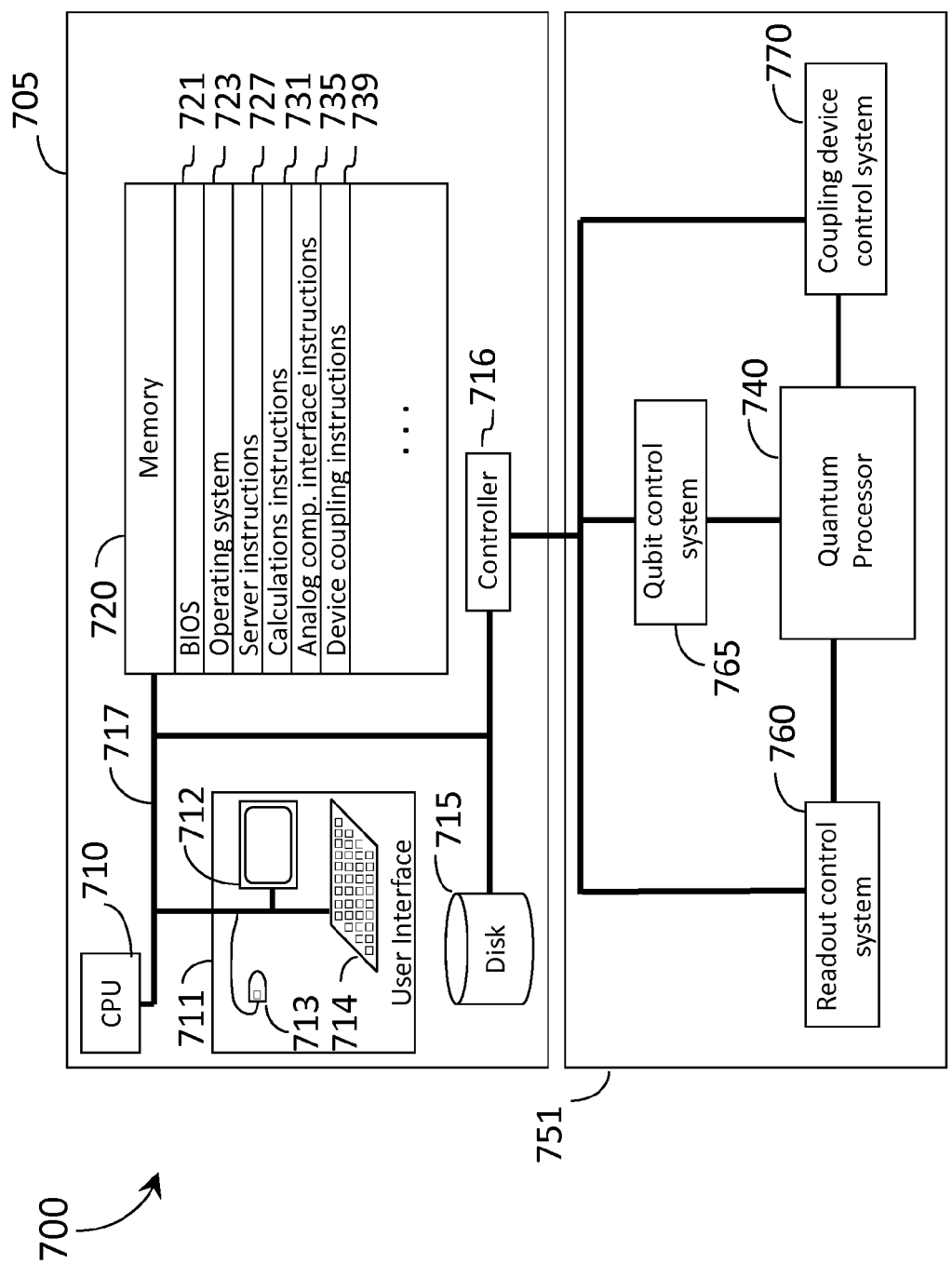
FIG. 7 is a schematic diagram that illustrates an exemplary hybrid computer including a digital processor and an analog processor in accordance with the present systems and methods.

FIG. 7 illustrates computing system 700 including a digital computer 705 coupled to an analog computer 751. In some embodiments the analog computer 751 is a quantum computer and the digital computer 705 is a classical computer. The exemplary digital computer 705 includes a digital processor that may be used to perform classical digital processing tasks described in the present systems and methods. Those skilled in the relevant art will appreciate that the present systems and methods can be practiced with other digital computer configurations, including hand-held devices, multiprocessor systems, microprocessor-based or programmable consumer electronics, personal computers ("PCs"), network PCs, mini-computers, mainframe computers, and the like, when properly configured or programmed to form special purpose machines, and/or when communicatively coupled to control an analog computer, for instance a quantum computer.

Digital computer 705 will at times be referred to in the singular herein, but this is not intended to limit the application to a single digital computer. The present systems and methods can also be practiced in distributed computing environments, where tasks or sets of instructions are performed or executed by remote processing devices, which are linked through a communications network. In a distributed computing environment sets of instruction, sometimes known as program modules, may be located in both local and remote memory storage devices.

Digital computer 705 may include at least one digital processor (such as, central processor unit 710), at least one system memory 720, and at least one system bus 717 that couples various system components, including system memory 720 to central processor unit 710.

The digital processor may be any logic processing unit, such as one or more central processing units ("CPUs"), graphics processing units ("GPUs"), digital signal processors ("DSPs"), application-specific integrated circuits ("ASICs"), field-programmable gate arrays ("FPGAs"), etc. Unless described otherwise, the construction and operation of the various blocks shown in FIG. 7 are of conventional design. As a result, such blocks need not be described in further detail herein, as they will be understood by those skilled in the relevant art.

Digital computer 705 may include a user input/output subsystem 711. In some embodiments, the user input/output subsystem includes one or more user input/output components such as a display 712, mouse 713, and/or keyboard 714. System bus 717 can employ any known bus structures or architectures, including a memory bus with a memory controller, a peripheral bus, and a local bus. System memory 720 may include non-volatile memory, such as read-only memory ("ROM"), static random access memory ("SRAM"), Flash NAND; and volatile memory such as random access memory ("RAM") (not shown). An basic input/output system ("BIOS") 721, which can form part of the ROM, contains basic routines that help transfer information between elements within digital computer 705, such as during startup.

Digital computer 705 may also include other non-volatile memory 715. Non-volatile memory 715 may take a variety of forms, including: a hard disk drive for reading from and writing to a hard disk, an optical disk drive for reading from and writing to removable optical disks, and/or a magnetic disk drive for reading from and writing to magnetic disks. The optical disk can be a CD-ROM or DVD, while the magnetic disk can be a magnetic floppy disk or diskette. Non-volatile memory 715 may communicate with digital processor via system bus 717 and may include appropriate interfaces or controllers 716 coupled to system bus 717. Non-volatile memory 715 may serve as long-term storage for computer-readable instructions, data structures, sets of processor readable instruction (also called program modules) and other data for digital computer 705.

Although digital computer 705 has been described as employing hard disks, optical disks and/or magnetic disks, those skilled in the relevant art will appreciate that other types of non-volatile computer-readable media may be employed, such a magnetic cassettes, flash memory cards, Flash, ROMs, smart cards, etc. Those skilled in the relevant art will appreciate that some computer architectures conflate volatile memory and non-volatile memory. For example, data in volatile memory can be cached to non-volatile memory. Or a solid-state disk that employs integrated circuits to provide non-volatile memory. Some computers place data traditionally stored on disk in memory. As well, some media that is traditionally regarded as volatile can have a non-volatile form, e.g., Non-Volatile Dual In-line Memory Module variation of Dual In Line Memory Modules.

Various sets of computer- or processor-readable instructions, application programs and/or data can be stored in system memory 720. For example, system memory 720 may store an operating system 723, and a set of computer- or processor-readable server instructions 727. In some embodiments, the set of server instructions 727 includes instruction for communicating with remote clients and scheduling use of resources including resources on the digital computer 705 and analog computer 751. For example, a Web server application and/or Web client or browser application for permitting digital computer 705 to exchange data with sources via the Internet, corporate Intranets, or other networks, as well as with other server applications executing on server computers.

In some embodiments system memory 720 may store a set of computer- or processor-readable calculation instructions 731 to perform pre-processing, co-processing, and post-processing to analog computer 751. In accordance with the present systems and methods, system memory 720 may store at set of analog computer interface instructions 735 operable to interact with the analog computer 751.

In some embodiments system memory 720 may store a set of device coupling instructions 739. For example, the set of device coupling instructions 739 can implement the methods like those described in FIG. 6 on digital computer 705 and analog computer 751. In some examples, the set of device coupling instructions 739 can be used to determine the coupling strength between two superconducting devices.

While shown in FIG. 7 as being stored in system memory 720, the sets of instructions shown and other data can also be stored elsewhere including in nonvolatile memory 715.

The analog computer 751 is provided in an isolated environment (not shown). For example, where the analog computer 751 is a quantum computer, the environment shields the internal elements of the quantum computer from heat, magnetic field, and the like. The analog computer 751 includes an analog processor 740. Examples of an analog processor include quantum processors such as the portions of those shown in FIGS. 1, 2 and 3.

A quantum processor includes programmable elements such as qubits, couplers, and other devices. The qubits are readout via readout out system 760. These results are fed to the various sets of computer or processor readable instructions for the digital computer 705 including the set of server instructions 727, the set of calculation instructions 731, the set of analog computer interface instructions 735, or other sets of instructions stored in nonvolatile memory 715, returned over a network or the like. The qubits are controlled via qubit control system 765. The couplers are controlled via coupler control system 770. In some examples of the qubit control system 765 and the coupler control system 770 are used to control couplers like couplers 111, 211, 311a, 311b, and 311c as described herein on analog processor 740.

In some examples the digital computer 705 can operate in a networking environment using logical connections to at least one client computer system. In some examples the digital computer 705 is coupled via logical connections to at least one database system. These logical connections may be formed using any means of digital communication, for example, through a network, such as a local area network ("LAN") or a wide area network ("WAN") including, for example, the Internet. The networking environment may include wired or wireless enterprise-wide computer networks, intranets, extranets, and/or the Internet. Other examples may include other types of communication networks such as telecommunications networks, cellular networks, paging networks, and other mobile networks. The information sent or received via the logical connections may or may not be encrypted. When used in a LAN networking environment, digital computer 705 may be connected to the LAN through an adapter or network interface card ("NIC") (communicatively linked to system bus 717). When used in a WAN networking environment, digital computer 105 may include an interface and modem (not shown), or a device such as NIC, for establishing communications over the WAN. Non-networked communications may additionally, or alternatively be employed.

Throughout this specification and the appended claims, the term "ferromagnetic region" when used to describe for example the susceptibility of a coupling device is used to describe a range of flux biases that may be applied to a coupling device such that a pair of superconducting devices communicatively coupled by the coupling device is ferromagnetically coupled. Similarly, throughout this specification and the appended claims, the term "anti-ferromagnetic region" when used to describe for example the susceptibility of a coupling device is used to describe a range of flux biases that may be applied to a coupling device such that a pair of superconducting devices communicatively coupled by the coupling device is anti-ferromagnetically coupled.

Throughout this specification and the appended claims, the terms "coupler" and "coupling device" are used interchangeably. However, both "coupler" and "coupling device" are used to describe a coupling loop of superconducting material interrupted by at least one Josephson junction that may be used to ferromagnetically, or anti-ferromagnetically couple a pair of superconducting devices together. Furthermore, throughout this specification and the appended claims, the phrase "a pair of communicatively coupled superconducting devices" is used to describe a pair of superconducting devices that may be ferromagnetically, or anti-ferromagnetically coupled together by a coupling device.

Throughout this specification and the appended claims, the term "superconducting" when used to describe a physical structure such as a "loop of superconducting material" is used to indicate a material that is capable of behaving as a superconductor at an appropriate temperature. A superconducting material may not necessarily be acting as a superconductor at all times in all embodiments of the present systems and methods.

The above description of illustrated embodiments, including what is described in the Abstract, is not intended to be exhaustive or to limit the embodiments to the precise forms disclosed. Although specific embodiments of and examples are described herein for illustrative purposes, various equivalent modifications can be made without departing from the spirit and scope of the disclosure, as will be recognized by those skilled in the relevant art. The teachings provided herein of the various embodiments can be applied to other analog processors, not necessarily the exemplary quantum processors generally described above.

The various embodiments described above can be combined to provide further embodiments. All of the commonly assigned US patent application publications, US patent applications, foreign patents, and foreign patent applications referred to in this specification and/or listed in the Application Data Sheet, including but not limited to U.S. provisional patent application Ser. No. 61/858,023, filed Jul. 24, 2013 are incorporated herein by reference, in their entirety. These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A quantum processor apparatus, comprising:
   a first superconducting device comprising a respective loop and at least one respective Josephson junction interrupting the respective loop;
   a second superconducting device comprising a respective loop and at least one respective Josephson junction interrupting the respective loop, the respective loop including a first portion and a second portion, the second superconducting device positioned with respect to the first superconducting device such that a static coupling is provided by a first inductive coupling between the first portion of the second superconducting device and the first superconducting device when a current passes through the respective loop of at least one of the first or the second superconduting device; and
   a third superconducting device comprising a respective loop and at least one respective Josephson junction interrupting the respective loop, the third superconducting device positioned with respect to the first and the second superconducting devices to provide a dynamic coupler-mediated coupling between the first superconducting device and the second superconducting device via a second inductive coupling between the first superconducting device and the second portion of the second superconducting device when the current passes through the respective loop of at least one of the first or the second superconduting device.

2. The quantum processor apparatus of claim 1 wherein the first superconducting device has a first principal direction, the first portion of the second superconducting device is non-orthogonal to the first principal direction of the first superconducting device, and the second portion of the second superconducting device is orthogonal to the first principal direction of the first superconducting device.

3. The quantum processor apparatus of claim 1 wherein an area enclosed by the respective loop of the first superconducting device overlaps at least a portion of an area enclosed by the respective loop of the second superconducting device when the area enclosed by the respective loop of the first superconducting device is projected toward a layer on which the respective loop of the second superconducting device resides.

4. The quantum processor apparatus of claim 3 wherein a number of portions of the respective loop of the first superconducting device pass over other portions of the respective loop of the first superconducting device such that an inductance in the area enclosed by the respective loop of the first superconducting device which overlaps at least the portion of the area enclosed by the respective loop of the second superconducting device generated by passage of the current through the respective loop of the first superconducting device is opposite in an orientation to an orientation of an inductance in a nonoverlapping area generated by passage of the current through the respective loop of the first superconducting.

5. The quantum processor apparatus of claim 4 wherein an inductance in the area enclosed by the respective loop of the second superconducting device which overlaps the portion of the area enclosed by the respective loop of the first superconducting device generated by passage of the current through the respective loop of the second conducting device is opposite in an orientation to the orientation of the inductance in the area enclosed by the respective loop of the first superconducting device which overlaps at least the portion of the area enclosed by the respective loop of the second superconducting device.

6. The quantum processor apparatus of claim 5 wherein the static coupling is ferromagnetic.

7. The quantum processor apparatus of claim 3 wherein an inductance in the area enclosed by the respective loop of the second superconducting device at least a portion of which is overlapped by the area enclosed by the respective loop of the first superconducting device generated by passage of the current through the respective loop of the second superconducting device is in a same orientation as an inductance in the area enclosed by the respective loop of the first superconducting device which overlaps at least the portion of the area enclosed by the respective loop of the second superconducting device generated by passage of the current through the respective loop of the first superconducting device.

8. The quantum processor apparatus of claim 7 wherein the static coupling is anti-ferromagnetic.

9. The quantum processor apparatus of claim 1 wherein the static coupling boosts a characteristic energy of the quantum processor.

10. The quantum processor apparatus of claim 1 wherein the dynamic coupler-mediated coupling has a ferromagnetic region and anti-ferromagnetic region and the static coupling makes the dynamic coupler-mediated coupling more tunable over the ferromagnetic region.

11. The quantum processor apparatus of claim 1 wherein the first inductive coupling has a first characteristic coupling strength and the dynamic coupler-mediated coupling has a second characteristic coupling strength, and the first characteristic coupling strength is greater than the second characteristic coupling strength.

12. The quantum processor apparatus of claim 1 wherein the first inductive coupling has a first characteristic coupling strength and the dynamic coupler-mediated coupling has a second characteristic coupling strength, and the first characteristic coupling strength is less than the second characteristic coupling strength.

13. The quantum processor apparatus of claim 1 wherein the first superconducting device and the second superconducting device are selected from the group consisting of:

superconducting qubits, coupling devices, quantum flux parametrons, multipliers, and L-tuners.

14. A method of operation of a quantum processor, wherein the quantum processor includes a first superconducting device comprising having a respective loop of material that is superconductive at or below threshold temperatures and at least one respective Josephson junction that interrupts the respective loop, a second superconducting device comprising having a respective loop of material that is superconductive at or below threshold temperatures and at least one respective Josephson junction that interrupts the respective loop, where the respective loops of the first and the second superconducting devices partially overlap one another and are not electrically contiguous with one another, a first portion of the respective loop of at least the first superconducting device arranged perpendicularly with respect to a first portion of the respective loop of the second superconducting device and a second portion of the respective loop of at least the first superconducting device arranged non-perpendicularly with respect to a second portion of the respective loop of the second superconducting device to directly communicatively couple the first superconducting device and the second superconducting device without any intervening superconducting devices, and a superconducting coupler operable to indirectly communicatively couple the first and the second superconducting devices to one another, the method comprising:
adjusting a beta value of the superconducting coupler that indirectly communicatively couples the first superconducting device and the second superconducting device based at least in part on the non-perpendicular orientation of the second portion of the first superconducting device with respect to the second portion of the second superconducting device which are also directly communicatively coupled without any intervening superconducting devices or superconducting couplers; and
communicatively coupling a signal to at least one of the first superconducting device or the second superconducting device.

15. The method of claim 14 wherein adjusting a beta value of the superconducting coupler that indirectly communicatively couples the first superconducting device and the second superconducting device includes decreasing the beta value in the superconducting coupler.

16. The method of claim 15 wherein decreasing the beta value in the superconducting coupler increases linearity of the superconducting coupler's response to an applied flux bias.

17. The method of claim 16 wherein decreasing the beta value in the superconducting coupler increases linearity of the superconducting coupler's response to an applied flux bias thereby increasing tunability of the superconducting coupler.

18. The method of claim 14 wherein adjusting a beta value in the superconducting coupler that indirectly communicatively couples the first superconducting device and the second superconducting device includes decreasing a magnitude of a persistent current in the superconducting coupler.

19. The method of claim 14 wherein adjusting a beta value of the superconducting coupler that indirectly communicatively couples the first superconducting device and the second superconducting device includes adjusting a beta value of the superconducting coupler that communicatively couples the first superconducting device and the second superconducting device based on a magnitude of an angular deviation between the second portions of the first superconducting device and the second superconducting device from being perpendicular to one another.

20. The method of claim 14 wherein adjusting a beta value of the superconducting coupler that indirectly communicatively couples the first superconducting device and the second superconducting device includes adjusting a beta value of the superconducting coupler that communicatively couples the first superconducting device and the second superconducting device based on a magnitude of an angular deviation between the second portions of the first superconducting device and the second superconducting device from being parallel with one another.

21. The method of claim 14 wherein the first superconducting device and the second superconducting device are selected from the group comprising the following pairs: a pair of superconducting qubits, a superconducting qubit and another superconducting device, and a pair of loops of superconducting material communicatively coupled to each other as a quantum flux parametrons, a multiplier, or an L-tuner; and communicatively coupling a signal to at least one of the first superconducting device or the second superconducting device includes communicatively coupling a signal directly to one of two superconducting devices of the selected pair of superconducting devices.

22. The method of claim 14 wherein the respective loops of the first superconducting device and the second superconducting device are elongated, and each loop has a pair of parallel sides.

23. The method of claim 22 wherein the first portion of the first superconducting device and the second superconducting device are portions of the parallel sides of the respective first portion of the first superconducting device and the second superconducting device.

24. The method of claim 14 wherein the first superconducting device is a first qubit and the second superconducting device is a second qubit, and further comprising:
indirectly communicatively coupling the first qubit with the second qubit via a coupler superconducting device, in addition to direct communicative coupling between the non-perpendicular portions of the first superconducting device and the second superconducting device.

25. The method of claim 24 further comprising:
adding a static signal to a mutual inductance of the coupling device.

26. A quantum processor apparatus, comprising:
a plurality of superconducting devices which are superconductive at or below threshold temperatures, a number of the superconducting devices having a respective loop and at least one respective Josephson junction interrupting the loop, for a first superconducting device of the plurality of superconducting devices and a second superconducting device of the plurality of superconducting devices which have respective loops that partially overlaps one another and are not electrically contiguous with one another, a first portion of the respective loop of at least the first superconducting device is arranged perpendicularly with respect to a first portion of the respective loop of the second superconducting device and a second portion of the respective loop of at least the first superconducting device arranged non-perpendicularly with respect to a second portion of the respective loop of the second superconducting device to directly communicatively couple the first superconducting device and the second superconducting device without any intervening superconducting devices, and
at least one of the first superconducting device or the second superconducting device directly communicatively coupled to one another via a third superconducting device of the plurality of superconducting devices that has a beta value adjusted based at least in part on the non-perpendicular orientation of the second portion of the first superconducting device with respect to the second portion of the second superconducting device which are directly communicatively coupled without any intervening superconducting devices.

27. The quantum processor apparatus of claim 26 wherein the third superconducting device that communicatively couples the first superconducting device and the second superconducting device has a respective decreased beta value.

28. The quantum processor apparatus of claim 26 wherein the third superconducting device that communicatively couples the first superconducting device and the second superconducting device has a decreased magnitude of a persistent current.

29. The quantum processor apparatus of claim 26 wherein the third superconducting device that communicatively couples the first superconducting device and the second superconducting device has a beta value adjusted based on a magnitude of an angular deviation between the second portions of the first superconducting device and the second superconducting device from being perpendicular to one another.

30. The quantum processor apparatus of claim 26 wherein the superconducting device that communicatively couples the first one and the second one of the superconducting devices has a beta value adjusted based on a magnitude of an angular deviation between the second portions of the first superconducting device and the second superconducting device from being parallel with one another.

31. The quantum processor apparatus of claim 26 wherein the first superconducting device and the second superconducting device are selected from the group comprising the following pairs: a pair of superconducting qubits, a superconducting qubit and another superconducting device, and a pair of loops of superconducting material communicatively coupled to each other as a quantum flux parametron, a multiplier, or an L-tuner.

32. The quantum processor apparatus of claim 26 wherein the respective loops of the first superconducting device and the second superconducting device are elongated, and each loop has a pair of parallel sides.

33. The quantum processor apparatus of claim 32 wherein the first portion of the first superconducting device and the superconducting device are portions of the parallel sides of the respective first portion of the first superconducting device and the superconducting device.

34. The quantum processor apparatus of claim 26 wherein a crossing geometry of the first and the second superconducting devices is altered to make $M_{qu-qu}$ ferromagnetic, anti-ferromagnetic, or close to zero.

35. A quantum processor, comprising:
a first superconducting device comprising having a respective loop of material that is superconductive at or below threshold temperatures and at least one respective Josephson junction that interrupts the respective loop;
a second superconducting device comprising having a respective loop of material that is superconductive at or below threshold temperatures and at least one respective Josephson junction that interrupts the respective loop, where the respective loops of the first and the second superconducting devices partially overlap one another and are not electrically contiguous with one another, a first portion of the respective loop of at least the first superconducting device arranged perpendicularly with respect to a first portion of the respective loop of the second superconducting device and a second portion of the respective loop of at least the first superconducting device arranged non-perpendicularly with respect to a second portion of the respective loop of the second superconducting device to directly communicatively couple the first superconducting device with the second superconducting device without any intervening superconducting devices, and
a superconducting coupler operable to communicatively couple the first and the second superconducting devices to one another.

* * * * *